United States Patent
Aylward et al.

(10) Patent No.: US 6,274,284 B1
(45) Date of Patent: Aug. 14, 2001

(54) NACREOUS IMAGING MATERIAL

(75) Inventors: Peter T. Aylward, Hilton; Alphonse D. Camp, Rochester; Robert P. Bourdelais, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/470,807

(22) Filed: Dec. 22, 1999

(51) Int. Cl.[7] .................. G03C 1/79; G03C 1/93; G03C 1/765; G03G 5/10
(52) U.S. Cl. ............... 430/97; 430/201; 430/496; 430/523; 430/531; 430/533; 430/534; 430/536; 430/538; 347/105; 503/227
(58) Field of Search ............................. 430/534, 536, 430/538, 97, 201, 523, 531, 533, 496; 347/105; 503/227

(56) References Cited

U.S. PATENT DOCUMENTS

| | | |
|---|---|---|
| 4,283,486 | 8/1981 | Aono et al. . |
| 4,632,869 | 12/1986 | Park et al. .................. 428/315.5 |
| 4,758,462 | 7/1988 | Park et al. ................... 428/213 |
| 5,141,685 | 8/1992 | Maier et al. .................. 264/45.3 |
| 5,244,861 | 9/1993 | Campbell et al. .............. 430/201 |
| 5,252,531 | 10/1993 | Yasuda et al. . |
| 5,275,854 | 1/1994 | Maier et al. .................. 428/36.5 |
| 5,422,175 | 6/1995 | Ito et al. . |
| 5,434,039 | 7/1995 | Nagata et al. ................. 430/538 |
| 5,443,951 | 8/1995 | Yamamoto et al. ................ 435/6 |
| 5,466,519 | 11/1995 | Shirakura et al. .............. 430/538 |
| 5,514,460 | 5/1996 | Surman et al. ............... 428/304.4 |
| 5,866,282 | 2/1999 | Bourdelais et al. ............. 430/536 |
| 5,888,643 | 3/1999 | Aylward et al. . |
| 5,888,681 | 3/1999 | Gula et al. ................... 430/536 |
| 5,888,714 | * 3/1999 | Bourdelais et al. ............. 430/538 |
| 6,030,742 | 2/2000 | Bourdelais et al. ............. 430/536 |
| 6,030,756 | 2/2000 | Bourdelais et al. ............. 430/534 |
| 6,093,521 | 7/2000 | Laney et al. . |

FOREIGN PATENT DOCUMENTS

WO 94/04961  3/1994  (WO) .

* cited by examiner

Primary Examiner—Richard L. Schilling
(74) Attorney, Agent, or Firm—Paul A. Leipold

(57) ABSTRACT

The invention relates to an imaging member comprising an image layer, a voided layer below said image layer, and below said voided layer a layer comprising white pigment wherein said imaging member is substantially free of white pigment above said voided layer, and said voided layer comprises a polymer matrix and voids containing gas.

21 Claims, 1 Drawing Sheet

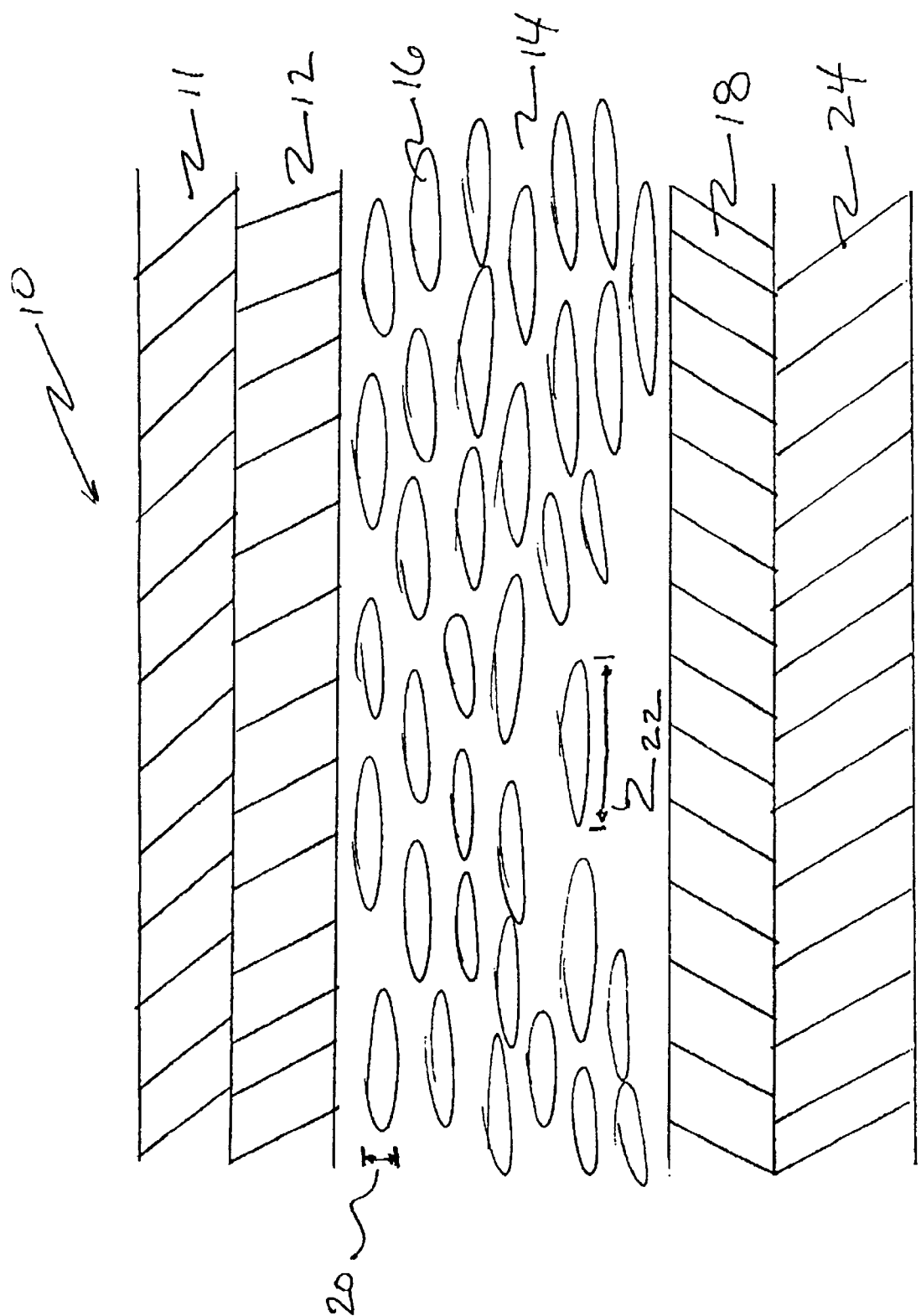

NACREOUS IMAGING MATERIAL

FIELD OF THE INVENTION

This invention relates to imaging materials. In a preferred form, it relates to base materials for photographic reflective paper.

BACKGROUND OF THE INVENTION

It has been proposed in U.S. Pat. No. 5,866,282 (Bourdelais et al.) to utilize a composite support material with laminated biaxially oriented polyolefin sheets as a photographic imaging material. In U.S. Pat. No. 5,866,282, biaxially oriented polyolefin sheets are extrusion laminated to cellulose paper to create a support for silver halide imaging layers. The biaxially oriented sheets described in U.S. Pat. No. 5,866,282 have a microvoided layer in combination with coextruded layers that contain white pigments such as $TiO_2$ above and below the microvoided layer. The composite imaging support structure described in U.S. Pat. No. 5,866,282 has been found to be more durable, sharper and brighter than prior art photographic paper imaging supports that use cast melt extruded polyethylene layers coated on cellulose paper.

A photographic element with a microvoided sheet of opalescence is described in U.S. Pat. No. 5,888,681 (Gula et al.). In U.S. Pat. No. 5,888,681 microvoided polymer sheets with microvoided polymer layer located between a cellulose paper base and developed silver halide imaging provide an image with a opalescence appearance. While the opalescence appearance is present in the image, the image suffers from a loss of image sharpness or acutance, a higher density minimum position and a decrease in printing speed compared to typical a photographic image on a white, reflecting base. It would be desirable if the desirable opalescent look of the image could be maintained while improving printing speed, increasing sharpness and decreasing density minimum.

Prior art reflective photographic display materials with a polyester base use a $TiO_2$ pigmented polyester base onto which light sensitive silver halide emulsions are coated. It has been proposed in WO 94/04961 to use opaque polyester containing 10% to 25% $TiO_2$ for a photographic support. The $TiO_2$ in the polyester or paper base is always located directly under the image layer to provide optimum sharpness and reflectivity. The $TiO_2$ also gives the base support a slight yellow tint which is undesirable for a photographic material. Furthermore the $TiO_2$ or other pigments corrupts the purity of the dye color. This is particularly true for reflective photographic images. For use as a photographic material, the polyester or other substrate support containing $TiO_2$ must be tinted blue to offset the yellow tint of the gelatin binder causing a loss in desirable whiteness and adding cost to the display material. Prior art photographic translucent display materials with incorporated diffusers which include transmission and reflective display materials typically contain some level of white pigment to either diffuse the backlighting source in the case of transmission display materials or provide the desired reflective properties in the case of a reflective display material.

In addition to the use of white pigments in reflective consumer photographs, white pigments are also utilized in photographic display materials for diffusion of illumination light source. While the use of white pigments in display materials does provide the desired diffusion and reflection properties, the white pigments tend to change the hue angle of the color dyes in a developed photographic display image. Dye hue angle is a measure in CIELAB color space of that aspect of color vision that can be related to regions of the color spectrum. For color photographic system there is a perceptual preferred dye hue angle for the yellow, magenta, and cyan dyes. It has been found that when photographic dyes are coated on support containing white pigments, the hue angle of the developed image changes compared to the hue angle of the dyes coated onto a transparent support. The hue angle change of photographic dyes caused by the presence of white pigments often reduces the quality level of the dyes compared to the dye set coated on a transparent base that is substantially free of white pigments. It would be desirable if a developed photographic dye set coated on a reflective support material had a dye hue angle that was not significantly different than the same dye set coated on a transparent support.

Prior art reflective photographic papers contain white pigments in the support just below the silver halide imaging layers to obtain image whiteness and sharpness during image exposure as the white pigment reduces the amount exposure light energy scattered by cellulose paper core. Details on the use of white pigments in highly loaded coextruded layers to obtain silver halide image sharpness and whiteness is recorded in U.S. Pat. No. 5,466,519.

PROBLEM TO BE SOLVED BY THE INVENTION

There is a need for a reflective imaging material that provides less corruption of dye hue angle when coated on a translucent support while, at the same time, maintains photographic sharpness or printing speed and whiter in appearance to the viewer.

SUMMARY OF THE INVENTION

It is an object of the invention to provide improved imaging materials.

It is another object to provide photographic reflective materials that have a maintained dye hue angle.

It is a further object to provide improved image sharpness and printing speed compared to prior art voided base photographic materials.

It is an additional object to provide imaging materials that have a nacreous appearance.

These and other objects of the invention are accomplished by an imaging member comprising an image layer, a voided layer below said image layer, and below said voided layer a layer comprising white pigment wherein said imaging member is substantially free of white pigment above said voided layer, and said voided layer comprises a polymer matrix and voids containing gas.

ADVANTAGEOUS EFFECT OF THE INVENTION

The invention provides brighter, snappy images by maintaining the dye hue of photographic dyes while, at the same time, providing images that have exceptional photographic sharpness and exposure speed. Further the images have a desirable nacreous appearance.

BRIEF DESCRIPTION OF THE DRAWINGS

The FIGURE is a drawing of the voided layer that provides the nacreous appearance.

DETAILED DESCRIPTION OF THE INVENTION

The invention has numerous advantages over prior art photographic reflective materials. The reflective materials of the invention provide an image with a nacreous appearance while maintaining efficient reflection of light, sharpness and photographic speed. Maintaining image sharpness and whiteness is important as consumers expect silver halide images to be high in quality. Further, maintaining printing speed is critical for efficient photographic processing as a significant loss in printer speed could increase the cost of consumer silver halide images. The base materials also maintain the dye hue angle of developed photographic dyes similar to those coated on a transparent base and eliminate the undesirable interaction between white pigments such as $TiO_2$ and imaging dyes. The optical properties of the imaging materials in accordance with the invention are improved as the tinting and optical brightening materials are concentrated in a layer of the biaxially oriented polymer sheet for most effective use with little waste of the colorant materials.

The nacreous imaging materials of the invention provide a eye catching appearance that make them particularly desirable in imaging applications that require obtaining the attention of the consumer. One example includes display materials that are intended to communicate an advertising message to people in a public setting such as a bus top, train station or airport. The nacreous images are differentiated in look from prior art materials and thus provide the pop and sizzle that can catch consumers attention. By providing the nacreous image with a pressure sensitive adhesive, the tough, durable nacreous image can be applied to various surfaces, which is particularly desirable for the youth market.

Photographic nacreous labels of the invention utilized in packaging markets enable a differentiated look and consumer appeal on store shelf. The utilization of the thin, flexible, and tough silver halide materials results in a packaging material having many superior properties. The packaging materials of the invention have a depth of image unsurpassed by existing packaging materials. The packaging materials of the invention may be utilized with a variety of packaging materials that are suitable pressure sensitive labeling, such as shampoo bottles, perfume bottles and film boxes. The packaging materials of the invention while having the advantage of superior image are available on thin base materials which are low in cost while providing superior opacity and strength. The packaging materials of the invention as they may be imaged by flash optical exposure or digital printing have the ability to be formed in short runs and to be rapidly switched from one image to the next without delay.

The photographic elements of this invention utilize an integral emulsion bonding layer that allows the emulsion to adhere to the support materials during manufacturing and wet processing of images without the need for expensive subbing coatings. The nacreous appearance of the image can be created utilizing a variety of imaging techniques. In addition to silver halide images, ink jet images, thermal dye transfer images, and electrophotographic images all have the nacreous appearance when the images are applied to the nacreous support. These and other advantages will be apparent from the detailed description below.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. The term substrate refers to any web base material that the voided polymer sheet is applied. Nacreous appearance is a pearly, luster, iridescent, metallic sheen. A characteristic property of a nacreous appearance is an angular dependence of viewing angle.

For the imaging element of the invention, imaging layers are applied to the top-side of the nacreous base. The imaging element contains a voided polymer layer below the imaging layers. The layers above the voided layer and below the imaging layers are substantially free of white pigments that have been shown to corrupt the dye hue inks, pigments or dyes used to form an image. Polymer layers below the voided layer do contain white, reflecting pigments, which have been shown to significantly improve sharpness, whiteness and photographic printing speed compared to prior art materials. Surprisingly, it has been found that when the voided polymer sheets of the invention, when applied to a cellulose paper core, provide photographic image sharpness, and printing speed comparable to prior art coextruded support materials that contain white pigments just below the imaging layers.

Preferred white pigment in polymer layers below the voided layer comprises $TiO_2$. $TiO_2$ is preferred because of it has a high refractive index which is important in adding opacity to the imaging member as well as maintaining sharpness by reducing the amount of exposure light entering the highly scattering cellulose paper base. The white pigment-containing layer may have at least 0.10 grams/cc of $TiO_2$. Below 0.10 g/cc there is a sufficiently low amount of $TiO_2$ that the photographic sharpness and speed are not adequately improved. At levels above 1.5 g/cc potential problems may occur with interlayer adhesion and the ability to more a uniformity lump free layer. The imaging member of this invention may have a layer of white pigment selected from one of the group comprising of $TiO_2$, $BaSO_4$, clay, talc, kaolin, and ZnS. The preferred spectral transmission of the white pigmented layer below the voided layer is less than 22%. Spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer.

The pre-formed voided polymer sheet preferably is an oriented polymer because of the strength and toughness developed in the orientation process. Preferred polymers for the flexible substrate include polyolefins, polyester and nylon. Preferred polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polyolefins are preferred, as they are low in cost and have the desirable strength and toughness properties required for a pressure sensitive label. Oriented polymer sheet have been shown to improve the tear resistance of the base material, reduce the curl of the image element and are generally capable of providing improved image sharpness and brightness compared to melt cast polymers. Examples of preferred biaxially oriented polymer sheet are disclosed in U.S. Pat. Nos. 5,866,282; 5,853,965; 5,874,205; 5,888,643; 5,888,683; 5,902,720; and 5,935,690. Further, the biaxially oriented sheets preferably laminated to cellulose paper, which are high in strength, have tear resistance greater than 150 N.

When white pigments are added to an oriented polymer layer the polymer layer preferably includes a stabilizing amount of hindered amine extruded on the top side of the imaging layer substrate. Hindered amine light stabilizers (HALS) originate from 2,2,6,6-tertramethylpiperidine. The hindered amine should be added to the polymer layer at about 0.01–5% by weight of said resin layer in order to provide resistance to polymer degradation upon exposure to UV light. The preferred amount is at about 0.05–3% by weight. This provides excellent polymer stability and resistance to cracking and yellowing while keeping the expense of the hindered amine to a minimum. Examples of suitable hindered amines with molecular weights of less than 2300 are Bis(2,2,6,6-letramethyl-4-piperidinyl)sebacate; Bis(1,2, 2,6,6-pentamethyl-4-piperidinyl)sebacate and Bis(1,2,2,6,6-pentamethyl-4-piperidinyl)2-n-butyl-(3,5-di-tert-butyl-hydroxy-benzyl)malonate.

Polyester polymers for the voided sheet of the invention are preferred as the mechanical modulus of polyester is higher than that of polyolefin polymers resulting in a stiffer, more durable image element. Further, it has been shown that higher amounts of white pigments can be added to polyester compared to polyolefin polymer, thus allowing additional improvements in image sharpness, whiteness and silver halide printing speed. Suitable dibasic acids useful for the preparation of polyesters include those containing from two to sixteen carbon atoms such as adipic acid, sebacic acid, isophthalic acid, terephthalic acid, and the like. Alkyl esters of acids such as those listed above can also be employed. Other alcohols and acids as well as polyesters prepared therefrom and the preparation of the polyesters are described in U.S. Pat. Nos. 2,720,503 and 2,901,466.

The voided layer below the imaging layers comprises a polymer matrix and voids containing gas. Voids are preferred because they provide an image with a nacreous appearance. Illustrated in the FIGURE is a cross section of a nacreous imaging element. Imaging element 11 is applied to a polymer layer 12 that is substantially free of white pigment. The voided layer consists of a matrix polymer 14 and voids 16 containing gas. Polymer layer 18 contains white pigment. The voids are geometrically characterized by void height 20 and void length 22. The voided polymer layer preferably has voids at any point in the member with at least six voids in the vertical direction. At least six voids in the vertical direction are preferred because less than 4 voids in the vertical direction does not provide an acceptable nacreous appearance to the image. Integral polymers layers 12, 14, and 18 are attached to substrate 24.

The voided polymer layer preferably has voids with a maximum length to maximum height ratio of greater than 4:1. It was surprisingly found that the elongated voids of greater than 4:1 provided a unique nacreous appearance as well as improved dye purity that when combined with a white pigmented layer below the said voided layer provides exceptional sharpness. A maximum length to maximum height ratio of greater less than 3:1 does not provide an acceptable nacreous image.

The preferred thickness of the voids in the polymer layer is between 0.5 and 4 micrometers. A void thickness less than 0.30 micrometers is difficult to obtain during orientation with typical voiding agents. Void thickness greater than 5 micrometers, while providing the nacreous appearance to the image, easily fractures and thus could reduce the quality of the image. The voided layer preferably has a thickness of between 8 and 50 micrometers. Voided layer thickness less than 4 micrometers are difficult to manufacture. A voided layer thickness greater than 60 micrometers, while providing the nacreous appearance, does not significantly improve image quality. Further, it has been shown that voided layer thickness greater than 65 micrometers begins to stress fracture as the image is subjected to consumer handling of images.

In the preferred embodiment of this invention the polymer matrix and the gas in the voids have a difference of refractive index of greater than 0.3. Having a difference in refractive index is critical in providing added opacity and whiteness to the image member. Layers between the voided polymer layer and the imaging layers preferably contain an optical brightener. Since said layer between said image layer and said voided layer is substantially free of white pigment, the optical brightener is fully fluorescent and is not quenched by the white pigment absorbing the ultraviolet light that commonly occurs with prior art imaging base materials. In such an imaging element the delta b* provides an extremely white appearing image.

An imaging member is provided with a substrate comprising cellulose paper is preferred. Paper is preferred as it provides an acceptable mechanical modulus at a lower cost than a polymer substrate. A low cost substrate is important for large volume consumer applications. Preferred photographic grade cellulose papers are disclosed in U.S. Pat. No. 5,288,690. To form a quality image the paper should have a surface roughness average less than 0.44 micrometers, have a density of between 1.05 and 1.20 grams/cc and utilize cellulose fibers that have an average length between 0.40 and 0.58 mm.

Polyester is also a preferred substrate as polyester provides exceptional durability that is a requirement for large format display applications. Polyester is also a preferred substrate as polyester is smoother than cellulose paper, contributing to the nacreous appearance of the image. Preferred polymer support materials include polyester, micro-voided polyester and polyolefin. Examples of preferred polymer image support bases are disclosed in U.S. Pat. Nos. 4,912,333; 4,999,312; and 5,055,371. Further, biaxially oriented polyester, which is high in strength, has tear resistance.

In a further embodiment of this invention the imaging member is provided with a substrate with a bottom outward facing pressure sensitive adhesive layer. This invention provides the ability to have a peel-off release liner on a image that then provides a unique nacreous adhesive sticker print or adhesive label for packaging of consumer goods. The adhesive may be a permanent or repositionable type adhesive that allows the imaged print or sticker to be removed from the liner and repositioned on the desired surface. Examples include photographic albums, doors, shampoo bottles, wine bottles, or food packages.

Suitable peelable nacreous label adhesives of this invention must not interact with the light sensitive silver halide imaging system so that image quality is deteriorated. Further, since imaging elements of this invention must be photoprocessed, the performance of the nacreous label adhesive of this invention must not be deteriorated by photographic processing chemicals. Suitable nacreous adhesive may be inorganic or organic, natural or synthetic, that is capable of bonding the image to the desired surface by surface attachment. Examples of inorganic nacreous adhesives are soluble silicates, ceramic and thermosetting powdered glass. Organic nacreous adhesives may be natural or synthetic. Examples of natural organic nacreous adhesives include bone glue, soybean starch cellulosics, rubber latex, gums, terpene, mucilages, and hydrocarbon resins. Examples of synthetic organic nacreous adhesives include elastomer solvents, polysulfide sealants, theromplastic resins such as isobutylene and polyvinyl acetate, theromsetting resins such as epoxy, phenoformaldehyde, polyvinyl butyral and cyanoacrylates and silicone polymers.

The nacreous image is preferably provided with an environmental protection layer which significantly improves the durability of the image which is particularly desirable for nacreous labels, stickers and display materials. The environmental protection layer may consist of suitable material that protects the image from environmental solvents, resists scratching and does not interfere with the image quality. The environmental protection layer is preferably applied to the photographic image after image development because the liquid processing chemistry required for image development must be able to efficiently penetrate the surface of the imaging layers to contact the silver halide and couplers utilizing typical silver halide imaging processes. The environmental protection layer would be generally impervious to developer chemistry. An environmental protection layer where transparent polymer particles are applied to the top most surface of the imaging layers in the presence of an electric field and fused to the top most layer causing the transparent polymer particles to form a continuous polymeric layer is preferred. An electrophotographic toner applied polymer is preferred as it is an effective way to provide a thin, protective environmental layer to the photographic label that has been shown to withstand environmental solvents and damage due to handling.

In another embodiment, the environmental protection layer is coatable from aqueous solution, which survives exposure and processing, and forms a continuous, water-impermeable protective layer in a post-process fusing step. The environmental protection layer is preferably formed by coating polymer beads or particles of 0.1 to 50 $\mu$m in average size together with a polymer latex binder on the emulsion side of a sensitized photographic product. After exposure and processing, the product with image is treated in such a way as to cause fusing and coalescence of the coated polymer beads, by heat and/or pressure (fusing), solvent treatment, or other means so as to form the desired continuous, water impermeable protective layer.

Examples of suitable polymers from which the polymer particles used in environmental protection layer can be selected include poly(vinyl chloride), poly(vinylidene chloride), poly(vinyl chloride-co-vinylidene chloride), chlorinated polypropylene, poly(vinyl chloride-co-vinyl acetate), poly(vinyl chloride-co-vinyl acetate-co-maleic anhydride), ethyl cellulose, nitrocellulose, poly(acrylic acid) esters, linseed oil-modified alkyd resins, rosin-modified alkyd resins, phenol-modified alkyd resins, phenolic resins, polyesters, poly(vinyl butyral), polyisocyanate resins, polyurethanes, poly(vinyl acetate), polyamides, chroman resins, dammar gum, ketone resins, maleic acid resins, vinyl polymers, such as polystyrene and polyvinyltoluene or copolymer of vinyl polymers with methacrylates or acrylates, poly(tetrafluoroethylene-hexafluoropropylene), low-molecular weight polyethylene, phenol-modified pentaerythritol esters, poly(styrene-co-indene-co-acrylonitrile), poly(styrene-co-indene), poly(styrene-co-acrylonitrile), poly(styrene-co-butadiene), poly(stearyl methacrylate) blended with poly(methyl methacrylate), copolymers with siloxanes and polyalkenes. These polymers can be used either alone or in combination. In a preferred embodiment of the invention, the polymer comprises a polyester or poly(styrene-co-butyl acrylate). Preferred polyesters are based on ethoxylated and/or propoxylated bisphenol A and one or more of terephthalic acid, dodecenylsuccinic acid and fumaric acid as they form an acceptable environmental protection layer that generally survives the rigors of a packaging label.

To increase the abrasion resistance of the environmental protection layer, polymers which are cross-linked or branched can be used. For example, poly(styrene-co-indene-co-divinylbenzene), poly(styrene-co-acrylonitrile-co-divinylbenzene), or poly(styrene-co-butadiene-co-divinylbenzene) can be used.

The polymer particles for the environmental protection layer should be transparent, and are preferably colorless. But it is specifically contemplated that the polymer particle can have some color for the purposes of color correction, or for special effects, so long as the image is viewable through the overcoat. Thus, there can be incorporated into the polymer particle dye which will impart color. In addition, additives can be incorporated into the polymer particle which will give to the overcoat desired properties. For example, a UV absorber can be incorporated into the polymer particle to make the overcoat UV absorptive, thus protecting the image from UV induced fading or blue tint can be incorporated into the polymer particle to offset the native yellowness of the gelatin used in the silver halide imaging layers.

In addition to the polymer particles which form the environmental protection layer there can be combined with the polymer composition other particles which will modify the surface characteristics of the element. Such particle are solid and nonfusible at the conditions under which the polymer particles are fused, and include inorganic particles, like silica, and organic particles, like methylmethacrylate beads, which will not melt during the fusing step and which will impart surface roughness to the overcoat.

The surface characteristics of the environmental protection layer are in large part dependent upon the physical characteristics of the polymer which forms the toner and the presence or absence of solid, nonfusible particles. However, the surface characteristics of the overcoat also can be modified by the conditions under which the surface is fused. For example, the surface characteristics of the fusing member that is used to fuse the toner to form the continuous overcoat layer can be selected to impart a desired degree of smoothness, texture or pattern to the surface of the element. Thus, a highly smooth fusing member will give a glossy surface to the imaged element, a textured fusing member will give a matte or otherwise textured surface to the element, a patterned fusing member will apply a pattern to the surface of the element.

Suitable examples of the polymer latex binder include a latex copolymer of butyl acrylate, 2-acrylamido-2-methylpropanesulfonate, and acetoacetoxyethylmethacrylate. Other latex polymers which are useful include polymers having a 20 to 10,000 nm diameter and a Tg of less than 60° C. suspended in water as a colloidal suspension.

Examples of suitable coating aids for the environmental protection layer include any water soluble polymer or other material that imparts appreciable viscosity to the coating suspension, such as high MW polysaccharide derivatives (e.g. xanthan gum, guar gum, gum acacia, Keltrol (an anionic polysaccharide supplied by Merck and Co., Inc.) high MW polyvinyl alcohol, carboxymethylcellulose, hydroxyethylcellulose, polyacrylic acid and its salts, polyacrylamide, etc). Surfactants include any surface active material that will lower the surface tension of the coating preparation sufficiently to prevent edge-withdrawal, repellencies, and other coating defects. These include alkyloxy- or alkylphenoxypolyether or polyglycidol derivatives and their sulfates, such as nonylphenoxypoly(glycidol) available from Olin Matheson Corporation or sodium octylphenoxypoly(ethyleneoxide) sulfate, organic sulfates or sulfonates, such as sodium dodecyl sulfate, sodium dodecyl sulfonate, sodium bis(2-ethylhexyl)sulfosuccinate (Aerosol OT), and alkylcarboxylate salts such as sodium decanoate.

The application of a ultraviolet polymerizable monomers and oligomers to the outermost layer of the developed silver halide imaging layers and subsequent radiation exposure to form a thin cross-linked protective layer is preferred. UV cure polymers are preferred as they can easily be applied to the outermost layer of the silver halide imaging layers and have been shown to provide an acceptable protective layer for the silver halide label material. Preferred UV cure polymers include aliphatic urethane, allyl methacrylate, ethylene glycol dimethacrylate, polyisocyanate and hydroxyethyl methacrylate. A preferred photoinitiator is benzil dimethyl ketal. The preferred intensity of radiation is between 0.1 and 1.5 milliwatt/cm$^2$. Below 0.05, insufficient cross linking occurs yielding a protective layer that does not offer sufficient protection for the labeling of packages.

The application of a pre-formed polymer layer to the outermost surface of the developed label silver halide image to form an environmental protection layer is most preferred. Application of a pre-formed sheet is preferred because pre-formed sheets are tough and durable easily withstanding the environmental solvents and handling forces applied to the silver halide imaged label. Application of the pre-formed polymer sheet is preferable carried out though lamination after image development. An adhesive is applied to either the photographic label or the preformed polymer sheet prior to a pressure nip that adheres the two surfaces and eliminates any trapped air that would degrade the quality of the image.

The application of a synthetic latex to the developed silver halide label image is another preferred environmental protection layer. A coating of synthetic latex has been shown to provide an acceptable environmental protection layer and can be coated in an aqueous solution eliminating exposure to solvents. The coating of latex has been shown to provide an acceptable environmental protection layer for the silver halide packaging label. Preferred synthetic latexes for the environmental protection layer are made by emulsion polymerization techniques from styrene butadiene copolymer, acrylate resins, and polyvinyl acetate. The preferred particles size for the synthetic latex ranges from 0.05 to 0.15 μm. The synthetic latex is applied to the outermost layer of the silver halide imaging layers by known coating methods that include rod coating, roll coating and hopper coating. The synthetic latexes must be dried after application and must dry transparent so as not to interfere with the quality of the image.

A further embodiment of the silver halide comprising imaging member is to further comprise said imaging member with matte in the upper gelatin protective layer. The inclusion of matte in the upper most layer of the image layer provides a means to minimize the sheen of a highly glossy spectral surface. Furthermore the matte in combination with a nacreous surface provides a unique appearance that has significant commercial value.

The structure of a preferred nacreous imaging element is listed below where the oriented polyolefin layers are provided as an integral sheet. Developed silver halide imaging layers
Oriented polyolefin with optical brightener
Oriented, voided polyolefin with void length:height ratio=5
Oriented polyolefin with 20% anatase TiO$_2$
Ethylene plastomer with 15% rutile TiO$_2$
Cellulose Paper with 2% rutile TiO$_2$
Ethylene plastomer
Oriented polyester sheet The structure of a preferred nacreous sticker material is provided below where the oriented polyolefin layers are provided as an integral sheet:

Developed silver halide imaging layers
Oriented polyolefin with optical brightener
Oriented, voided polyolefin with length:height ratio=8
Oriented polyolefin with 12% anatase TiO$_2$
Acrylic pressure sensitive adhesive
Silicone release layer
Oriented polyester sheet As used herein the phrase "imaging element" is a material that may be used as a imaging support for the transfer of images to the support by techniques such as ink jet printing, thermal dye transfer or electrophotographic printing as well as a support for silver halide images. As used herein, the phrase "photographic element" is a material that utilizes photosensitive silver halide in the formation of images. The thermal dye image-receiving layer of the receiving elements of the invention may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS0001), a TDK Thermal Head F415 HH7-1089 or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photorecptors.

In one form of the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created iono-graphically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent these toners form a film bonded to the paper. For heat-fusible toners, thermoplastic polymers are used as part of the particle. Heating both removes residual liquid and fixes the toner to paper.

Ink jet images on a nacreous support are preferred as they provide a digital printing method that can be utilized in the home. The dye receiving layer or DRL for ink jet imaging may be applied by any known methods. Such as solvent coating, or melt extrusion coating techniques. The DRL is coated over the TL at a thickness ranging from 0.1–10 μm, preferably 0.5–5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al. in U.S. Pat. Nos. 4,879,166; 5,264,275; 5,104,730; 4,879,166, and Japanese Patent Nos. 1,095,091; 2,276,671; 2,276,670; 4,267,180; 5,024,335; and 5,016,517 discloses aqueous based DRL formulations comprising mixtures of psuedo-bohemite and certain water soluble resins. Light, in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al. in U.S. Pat. Nos. 4,857,386 and 5,102,717 disclose ink-absorbent resin layers comprising mixtures of vinyl pyrrolidone polymers and acrylic or methacrylic polymers. Sato et al. in U.S. Pat. No. 5,194,317 and Higuma et al. in U.S. Pat. No. 5,059,983 disclose aqueous-coatable DRL formulations based on poly (vinyl alcohol). Iqbal, in U.S. Pat. No. 5,208,092, discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 micrometers DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, anti-oxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Nacreous silver halide images are preferred as they provide both the nacreous appearance as well as photographic dye purity. This invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to $100\mu$ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above.

This invention in a preferred embodiment utilizes a radiation-sensitive emulsion comprised of silver halide grains (a) containing greater than 50 mole percent chloride, based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula

$$[ML_6] \qquad (I)$$

wherein n is zero, −1, −2, −3 or −4; M is a filled frontier orbital polyvalent metal ion, other than iridium; and $L_6$ represents bridging ligands which can be independently selected, provided that least four of the ligands are anionic ligands, and at least one of the ligands is a cyano ligand or a ligand more electronegative than a cyano ligand; and (ii) an iridium coordination complex containing a thiazole or substituted thiazole ligand.

This invention is directed towards a photographic recording element comprising a support and at least one light sensitive silver halide emulsion layer comprising silver halide grains as described above.

It has been discovered quite surprisingly that the combination of dopants (i) and (ii) provides greater reduction in reciprocity law failure than can be achieved with either dopant alone. Further, unexpectedly, the combination of dopants (i) and (ii) achieve reductions in reciprocity law failure beyond the simple additive sum achieved when employing either dopant class by itself. It has not been reported or suggested prior to this invention that the combination of dopants (i) and (ii) provides greater reduction in reciprocity law failure, particularly for high intensity and short duration exposures. The combination of dopants (i) and (ii) further unexpectedly achieves high intensity reciprocity with iridium at relatively low levels, and both high and low intensity reciprocity improvements even while using conventional gelatino-peptizer (e.g., other than low methionine gelatino-peptizer).

In a preferred practical application, the advantages of the invention can be transformed into increased throughput of digital substantially artifact-free color print images while exposing each pixel sequentially in synchronism with the digital data from an image processor.

In one embodiment, the present invention represents an improvement on the electronic printing method. Specifically, this invention in one embodiment is directed to an electronic printing method which comprises subjecting a radiation sensitive silver halide emulsion layer of a recording element to actinic radiation of at least $10^{-4}$ ergs/cm$^2$ for up to $100\mu$ seconds duration in a pixel-by-pixel mode. The present invention realizes an improvement in reciprocity failure by selection of the radiation sensitive silver halide emulsion layer. While certain embodiments of the invention are specifically directed towards electronic printing, use of the emulsions and elements of the invention is not limited to such specific embodiment, and it is specifically contemplated that the emulsions and elements of the invention are also well suited for conventional optical printing.

It has been unexpectedly discovered that significantly improved reciprocity performance can be obtained for silver halide grains (a) containing greater than 50 mole percent chloride, based on silver, and (b) having greater than 50 percent of their surface area provided by {100} crystal faces by employing a hexacoordination complex dopant of class (i) in combination with an iridium complex dopant comprising a thiazole or substituted thiazole ligand. The reciprocity improvement is obtained for silver halide grains employing conventional gelatino-peptizer, unlike the contrast improvement described for the combination of dopants set forth in U.S. Pat. Nos. 5,783,373 and 5,783,378, which requires the use of low methionine gelatino-peptizers as discussed therein, and which states it is preferable to limit the concentration of any gelatino-peptizer with a methionine level of greater than 30 micromoles per gram to a concentration of less than 1 percent of the total peptizer employed. Accordingly, in specific embodiments of the invention, it is specifically contemplated to use significant levels (i.e., greater than 1 weight percent of total peptizer) of conventional gelatin (e.g., gelatin having at least 30 micromoles of methionine per gram) as a gelatino-peptizer for the silver halide grains of the emulsions of the invention. In preferred embodiments of the invention, gelatino-peptizer is employed which comprises at least 50 weight percent of gelatin containing at least 30 micromoles of methionine per gram, as it is frequently desirable to limit the level of oxidized low methionine gelatin which may be used for cost and certain performance reasons.

In a specific, preferred form of the invention it is contemplated to employ a class (i) hexacoordination complex dopant satisfying the formula:

$$[ML_6]^n \qquad (I)$$

where n is zero, −1, −2, −3 or −4;

M is a filled frontier orbital polyvalent metal ion, other than iridium, preferably Fe$^{+2}$, Ru$^{+2}$, Os$^{+2}$, Co$^{+3}$, Rh$^{+3}$, Pd$^{+4}$ or Pt$^{+4}$, more preferably an iron, ruthenium or osmium ion, and most preferably a ruthenium ion;

$L_6$ represents six bridging ligands which can be independently selected, provided that least four of the ligands are anionic ligands and at least one (preferably at least 3 and optimally at least 4) of the ligands is a cyano ligand or a ligand more electronegative than a cyano ligand. Any remaining ligands can be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. Hexacoordinated transition metal complexes of class (i) which include six cyano ligands are specifically preferred.

Illustrations of specifically contemplated class (i) hexacoordination complexes for inclusion in the high chloride grains are provided by Olm et al U.S. Pat. No. 5,503,970 and Daubendiek et al U.S. Pat. Nos. 5,494,789 and 5,503,971, and Keevert et al U.S. Pat. No. 4,945,035, as well as Murakami et al Japanese Patent Application Hei-2[1990]-

249588, and *Research Disclosure* Item 36736. Useful neutral and anionic organic ligands for class (ii) dopant hexacoordination complexes are disclosed by Olm et al U.S. Pat. No. 5,360,712 and Kuromoto et al U.S. Pat. No. 5,462,849.

Class (i) dopant is preferably introduced into the high chloride grains after at least 50 (most preferably 75 and optimally 80) percent of the silver has been precipitated, but before precipitation of the central portion of the grains has been completed. Preferably class (i) dopant is introduced before 98 (most preferably 95 and optimally 90) percent of the silver has been precipitated. Stated in terms of the fully precipitated grain structure, class (i) dopant is preferably present in an interior shell region that surrounds at least 50 (most preferably 75 and optimally 80) percent of the silver and, with the more centrally located silver, accounts the entire central portion (99 percent of the silver), most preferably accounts for 95 percent, and optimally accounts for 90 percent of the silver halide forming the high chloride grains. The class (i) dopant can be distributed throughout the interior shell region delimited above or can be added as one or more bands within the interior shell region.

Class (i) dopant can be employed in any conventional useful concentration. A preferred concentration range is from $10^{-8}$ to $10^{-3}$ mole per silver mole, most preferably from $10^{-6}$ to $5 \times 10^{-4}$ mole per silver mole.

The following are specific illustrations of class (i) dopants:

(i-1) $[Fe(CN)_6]^{-4}$
(i-2) $[Ru(CN)_6]^{-4}$
(i-3) $[Os(CN)_6]^{-4}$
(i-4) $[Rh(CN)_6]^{-3}$
(i-5) $[Co(CN)_6]^{-3}$
(i-6) $[Fe(pyrazine)(CN)_5]^{-4}$
(i-7) $[RuCl(CN)_5]^{-4}$
(i-8) $[OsBr(CN)_5]^{-4}$
(i-9) $[RhF(CN)_5]^{-3}$
(i-10) $[In(NCS)_6]^{-3}$
(i-11) $[FeCO(CN)_5]^{-3}$
(i-12) $[RuF_2(CN)_4]^{-4}$
(i-13) $[OsCl_2(CN)_4]^{-4}$
(i-14) $[RhI_2(CN)_4]^{-3}$
(i-15) $[Ga(NCS)_6]^{-3}$
(i-16) $[Ru(CN)_5(OCN)]^{-4}$
(i-17) $[Ru(CN)_5(N_3)]^{-4}$
(i-18) $[Os(CN)_5(SCN)]^{-4}$
(i-19) $[Rh(CN)_5(SeCN)]^{-3}$
(i-20) $[Os(CN)Cl_5]^{-4}$
(i-21) $[Fe(CN)_3Cl_3]^{-3}$
(i-22) $[Ru(CO)_2(CN)_4]^{-1}$ When the class (i) dopants have a net negative charge, it is appreciated that they are associated with a counter ion when added to the reaction vessel during precipitation. The counter ion is of little importance, since it is ionically dissociated from the dopant in solution and is not incorporated within the grain. Common counter ions known to be fully compatible with silver chloride precipitation, such as ammonium and alkali metal ions, are contemplated. It is noted that the same comments apply to class (ii) dopants, otherwise described below.

The class (ii) dopant is an iridium coordination complex containing at least one thiazole or substituted thiazole ligand. Careful scientific investigations have revealed Group VIII hexahalo coordination complexes to create deep electron traps, as illustrated R. S. Eachus, R. E. Graves and M. T. Olm *J. Chem. Phys.*, Vol. 69, pp. 4580–7 (1978) and *Physica Status Solidi A*, Vol. 57, 429–37 (1980) and R. S. Eachus and M. T. Olm *Annu. Rep. Prog Chem. Sect. C. Phys.* *Chem.*, Vol. 83, 3, pp. 3–48 (1986). The class (ii) dopants employed in the practice of this invention are believed to create such deep electron traps. The thiazole ligands may be substituted with any photographically acceptable substituent which does not prevent incorporation of the dopant into the silver halide grain. Exemplary substituents include lower alkyl (e.g., alkyl groups containing 1–4 carbon atoms), and specifically methyl. A specific example of a substituted thiazole ligand which may be used in accordance with the invention is 5-methylthiazole. The class (ii) dopant preferably is an iridium coordination complex having ligands each of which are more electropositive than a cyano ligand. In a specifically preferred form the remaining non-thiazole or non-substituted-thiazole ligands of the coordination complexes forming class (ii) dopants are halide ligands.

It is specifically contemplated to select class (ii) dopants from among the coordination complexes containing organic ligands disclosed by Olm et al U.S. Pat. Nos. 5,360,712 and 5,457,021 and Kuromoto et al U.S. Pat. No. 5,462,849.

In a preferred form it is contemplated to employ as a class (ii) dopant a hexacoordination complex satisfying the formula:

$$[IrL^6_1]^{n'} \qquad (II)$$

wherein n' is zero, −1, −2, −3 or −4; and $L^1_6$ represents six bridging ligands which can be independently selected, provided that at least four of the ligands are anionic ligands, each of the ligands is more electropositive than a cyano ligand, and at least one of the ligands comprises a thiazole or substituted thiazole ligand. In a specifically preferred form at least four of the ligands are halide ligands, such as chloride or bromide ligands.

Class (ii) dopant is preferably introduced into the high chloride grains after at least 50 (most preferably 85 and optimally 90) percent of the silver has been precipitated, but before precipitation of the central portion of the grains has been completed. Preferably class (ii) dopant is introduced before 99 (most preferably 97 and optimally 95) percent of the silver has been precipitated. Stated in terms of the fully precipitated grain structure, class (ii) dopant is preferably present in an interior shell region that surrounds at least 50 (most preferably 85 and optimally 90) percent of the silver and, with the more centrally located silver, accounts the entire central portion (99 percent of the silver), most preferably accounts for 97 percent, and optimally accounts for 95 percent of the silver halide forming the high chloride grains. The class (ii) dopant can be distributed throughout the interior shell region delimited above or can be added as one or more bands within the interior shell region.

Class (ii) dopant can be employed in any conventional useful concentration. A preferred concentration range is from $10^{-9}$ to $10^{-4}$ mole per silver mole. Iridium is most preferably employed in a concentration range of from $10^{-8}$ to $10^{-5}$ mole per silver mole.

Specific illustrations of class (ii) dopants are the following:

(ii-1) $[IrCl_5(thiazole)]^{-2}$
(ii-2) $[IrCl_4(thiazole)_2]^{-1}$
(ii-3) $[IrBr_5(thiazole)]^{-2}$
(ii-4) $[IrBr_4(thiazole)_2]^{-1}$
(ii-5) $[IrCl_5(5\text{-methylthiazole})]^{-2}$
(ii-6) $[IrCl_4(5\text{-methylthiazole})_2]^{-1}$
(ii-7) $[IrBr_5(5\text{-methylthiazole})]^{-2}$
(ii-8) $[IrBr_4(5\text{-methylthiazole})_2]^{-1}$ In one preferred aspect of the invention in a layer using a magenta dye forming coupler, a class (ii) dopant in combination with an OsCl$_5$(NO) dopant has been found to produce a preferred result.

Emulsions demonstrating the advantages of the invention can be realized by modifying the precipitation of conventional high chloride silver halide grains having predominantly (>50%) {100} crystal faces by employing a combination of class (i) and (ii) dopants as described above.

The silver halide grains precipitated contain greater than 50 mole percent chloride, based on silver. Preferably the grains contain at least 70 mole percent chloride and, optimally at least 90 mole percent chloride, based on silver. Iodide can be present in the grains up to its solubility limit, which is in silver iodochloride grains, under typical conditions of precipitation, about 11 mole percent, based on silver. It is preferred for most photographic applications to limit iodide to less than 5 mole percent iodide, most preferably less than 2 mole percent iodide, based on silver.

Silver bromide and silver chloride are miscible in all proportions. Hence, any portion, up to 50 mole percent, of the total halide not accounted for chloride and iodide, can be bromide. For color reflection print (i.e., color paper) uses bromide is typically limited to less than 10 mole percent based on silver and iodide is limited to less than 1 mole percent based on silver.

In a widely used form high chloride grains are precipitated to form cubic grains—that is, grains having {100} major faces and edges of equal length. In practice ripening effects usually round the edges and corners of the grains to some extent. However, except under extreme ripening conditions substantially more than 50 percent of total grain surface area is accounted for by {100} crystal faces.

High chloride tetradecahedral grains are a common variant of cubic grains. These grains contain 6 {100} crystal faces and 8 {111} crystal faces. Tetradecahedral grains are within the contemplation of this invention to the extent that greater than 50 percent of total surface area is accounted for by {100} crystal faces.

Although it is common practice to avoid or minimize the incorporation of iodide into high chloride grains employed in color paper, it is has been recently observed that silver iodochloride grains with {100} crystal faces and, in some instances, one or more {111} faces offer exceptional levels of photographic speed. In the these emulsions iodide is incorporated in overall concentrations of from 0.05 to 3.0 mole percent, based on silver, with the grains having a surface shell of greater than 50 Å that is substantially free of iodide and a interior shell having a maximum iodide concentration that surrounds a core accounting for at least 50 percent of total silver. Such grain structures are illustrated by Chen et al EPO 0 718 679.

In another improved form the high chloride grains can take the form of tabular grains having {100} major faces. Preferred high chloride {100} tabular grain emulsions are those in which the tabular grains account for at least 70 (most preferably at least 90) percent of total grain projected area. Preferred high chloride {100} tabular grain emulsions have average aspect ratios of at least 5 (most preferably at least >8). Tabular grains typically have thicknesses of less than 0.3 μm, preferably less than 0.2 μm, and optimally less than 0.07 μm. High chloride {100} tabular grain emulsions and their preparation are disclosed by Maskasky U.S. Pat. Nos. 5,264,337 and 5,292,632, House et al U.S. Pat. No. 5,320,938, Brust et al U.S. Pat. No. 5,314,798, and Chang et al U.S. Pat. No. 5,413,904.

Once high chloride grains having predominantly {100} crystal faces have been precipitated with a combination of class (i) and class (ii) dopants described above, chemical and spectral sensitization, followed by the addition of conventional addenda to adapt the emulsion for the imaging application of choice can take any convenient conventional form. These conventional features are illustrated by *Research Disclosure*, Item 38957, cited above, particularly:

III. Emulsion washing;
IV. Chemical sensitization;
V. Spectral sensitization and desensitization;
VII. Antifoggants and stabilizers;
VIII. Absorbing and scattering materials;
IX. Coating and physical property modifying addenda; and
X. Dye image formers and modifiers.

Some additional silver halide, typically less than 1 percent, based on total silver, can be introduced to facilitate chemical sensitization. It is also recognized that silver halide can be epitaxially deposited at selected sites on a host grain to increase its sensitivity. For example, high chloride {100} tabular grains with corner epitaxy are illustrated by Maskasky U.S. Pat. No. 5,275,930. For the purpose of providing a clear demarcation, the term "silver halide grain" is herein employed to include the silver necessary to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains while silver halide that deposits and provides the final {100} crystal faces of the grains is included in the total silver forming the grains, even when it differs significantly in composition from the previously precipitated silver halide.

Image dye-forming couplers may be included in the element such as couplers that form cyan dyes upon reaction with oxidized color developing agents which are described in such representative patents and publications as: U.S. Pat. Nos. 2,367,531; 2,423,730; 2,474,293; 2,772,162; 2,895, 826; 3,002,836; 3,034,892; 3,041,236; 4,883,746 and "Farbkuppler—Eine Literature Ubersicht," published in Agfa Mitteilungen, Band III, pp. 156–175 (1961). Preferably such couplers are phenols and naphthols that form cyan dyes on reaction with oxidized color developing agent. Also preferable are the cyan couplers described in, for instance, European Patent Application Nos. 491,197; 544,322; 556, 700; 556,777; 565,096; 570,006; and 574,948.

Typical cyan couplers are represented by the following formulas:

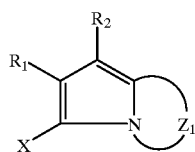

CYAN-1

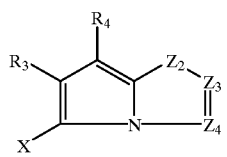

CYAN-2

CYAN-3

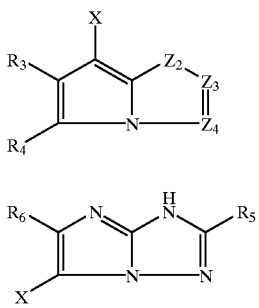

CYAN-4

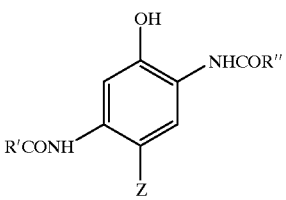

wherein $R_1$, $R_5$ and $R_8$ each represents a hydrogen or a substituent; $R_2$ represents a substituent; $R_3$, $R_4$ and $R_7$ each represent an electron attractive group having a Hammett's substituent constant $\sigma_{para}$ of 0.2 or more and the sum of the $\sigma_{para}$ values of $R_3$ and $R_4$ is 0.65 or more; $R_6$ represents an electron attractive group having a Hammett's substituent constant $\sigma_{para}$ of 0.35 or more; X represents a hydrogen or a coupling-off group; $Z_1$ represents nonmetallic atoms necessary for forming a nitrogen-containing, six-membered, heterocyclic ring which has at least one dissociative group; $Z_2$ represents —C($R_7$)= and —N=; and $Z_3$ and $Z_4$ each represent —C($R_8$)= and —N=.

For purposes of this invention, an "NB coupler" is a dye-forming coupler which is capable of coupling with the developer 4-amino-3-methyl-N-ethyl-N-(2-methanesulfonamidoethyl) aniline sesquisulfate hydrate to form a dye for which the left bandwidth (LBW) of its absorption spectra upon "spin coating" of a 3% w/v solution of the dye in di-n-butyl sebacate solvent is at least 5 nm. less than the LBW for a 3% w/v solution of the same dye in acetonitrile. The LBW of the spectral curve for a dye is the distance between the left side of the spectral curve and the wavelength of maximum absorption measured at a density of half the maximum.

The "spin coating" sample is prepared by first preparing a solution of the dye in di-n-butyl sebacate solvent (3% w/v). If the dye is insoluble, dissolution is achieved by the addition of some methylene chloride. The solution is filtered and 0.1–0.2 ml is applied to a clear polyethylene terephthalate support (approximately 4 cm×4 cm) and spun at 4,000 RPM using the Spin Coating equipment, Model No. EC101, available from Headway Research, Inc., Garland, Tet. The transmission spectra of the so prepared dye samples are then recorded.

Preferred "NB couplers" form a dye which, in n-butyl sebacate, has a LBW of the absorption spectra upon "spin coating" which is at least 15 nm, preferably at least 25 nm, less than that of the same dye in a 3% solution (w/v) in acetonitrile.

In a preferred embodiment the cyan dye-forming "NB coupler" useful in the invention has the formula (IA)

$$\text{(IA)}$$

(structure IA shown)

wherein
R' and R" are substituents selected such that the coupler is a "NB coupler", as herein defined; and
Z is a hydrogen atom or a group which can be split off by the reaction of the coupler with an oxidized color developing agent.

The coupler of formula (IA) is a 2,5-diamido phenolic cyan coupler wherein the substituents R' and R" are preferably independently selected from unsubstituted or substituted alkyl, aryl, amino, alkoxy and heterocyclyl groups.

In a further preferred embodiment, the "NB coupler" has the formula (I):

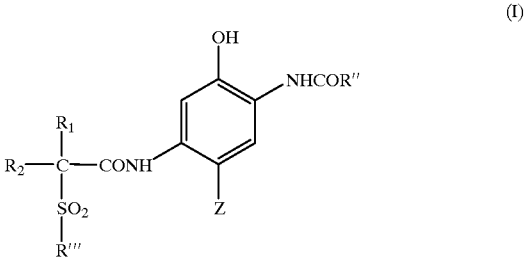

wherein
R" and R'" are independently selected from unsubstituted or substituted alkyl, aryl, amino, alkoxy and heterocyclyl groups and Z is as hereinbefore defined;
$R_1$ and $R_2$ are independently hydrogen or an unsubstituted or substituted alkyl group; and
Typically, R" is an alkyl, amino or aryl group, suitably a phenyl group. R'" is desirably an alkyl or aryl group or a 5–10 membered heterocyclic ring which contains one or more heteroatoms selected from nitrogen, oxygen and sulfur, which ring group is unsubstituted or substituted.

In the preferred embodiment the coupler of formula (I) is a 2,5-diamido phenol in which the 5-amido moiety is an amide of a carboxylic acid which is substituted in the alpha position by a particular sulfone (—$SO_2$—) group, such as, for example, described in U.S. Pat. No. 5,686,235. The sulfone moiety is an unsubstituted or substituted alkylsulfone or a heterocyclyl sulfone or it is an arylsulfone, which is preferably substituted, in particular in the meta and/or para position.

Couplers having these structures of formulae (I) or (IA) comprise cyan dye-forming "NB couplers" which form image dyes having very sharp-cutting dye hues on the short wavelength side of the absorption curves with absorption maxima ($\lambda_{max}$) which are shifted hypsochromically and are generally in the range of 620–645 nm, which is ideally suited for producing excellent color reproduction and high color saturation in color photographic papers.

Referring to formula (I), $R_1$ and $R_2$ are independently hydrogen or an unsubstituted or substituted alkyl group, preferably having from 1 to 24 carbon atoms and in particular 1 to 10 carbon atoms, suitably a methyl, ethyl, n-propyl, isopropyl, butyl or decyl group or an alkyl group substituted with one or more fluoro, chloro or bromo atoms, such as a trifluoromethyl group. Suitably, at least one of $R_1$ and $R_2$ is a hydrogen atom and if only one of $R_1$ and $R_2$ is a hydrogen atom then the other is preferably an alkyl group having 1 to 4 carbon atoms, more preferably one to three carbon atoms and desirably two carbon atoms.

As used herein and throughout the specification unless where specifically stated otherwise, the term "alkyl" refers to an unsaturated or saturated straight or branched chain alkyl group, including alkenyl, and includes aralkyl and cyclic alkyl groups, including cycloalkenyl, having 3–8 carbon atoms and the term 'aryl' includes specifically fused aryl.

In formula (I), R" is suitably an unsubstituted or substituted amino, alkyl or aryl group or a 5–10 membered heterocyclic ring which contains one or more heteroatoms selected from nitrogen, oxygen and sulfur, which ring is unsubstituted or substituted, but is more suitably an unsubstituted or substituted phenyl group.

Examples of suitable substituent groups for this aryl or heterocyclic ring include cyano, chloro, fluoro, bromo, iodo, alkyl- or aryl-carbonyl, alkyl- or aryl-oxycarbonyl, carbonamido, alkyl- or aryl-carbonamido, alkyl- or aryl-sulfonyl, alkyl- or aryl-sulfonyloxy, alkyl- or aryl-oxysulfonyl, alkyl- or aryl-sulfoxide, alkyl- or aryl-sulfamoyl, alkyl- or aryl-sulfonamido, aryl, alkyl, alkoxy, aryloxy, nitro, alkyl- or aryl-ureido and alkyl- or aryl-carbarnoyl groups, any of which may be further substituted. Preferred groups are halogen, cyano, alkoxycarbonyl, alkylsulfamoyl, alkyl-sulfonamido, alkylsulfonyl, carbamoyl, alkylcarbamoyl or alkylcarbonamido. Suitably, R" is a 4-chlorophenyl, 3,4-di-chlorophenyl, 3,4-difluorophenyl, 4-cyanophenyl, 3-chloro-4-cyanophenyl, pentafluorophenyl, or a 3- or 4-sulfonamidophenyl group.

In formula (I), when R'" is alkyl it may be unsubstituted or substituted with a substituent such as halogen or alkoxy. When R'" is aryl or a heterocycle, it may be substituted. Desirably it is not substituted in the position alpha to the sulfonyl group.

In formula (I), when R'" is a phenyl group, it may be substituted in the meta and/or para positions with one to three substituents independently selected from the group consisting of halogen, and unsubstituted or substituted alkyl, alkoxy, aryloxy, acyloxy, acylamino, alkyl- or aryl-sulfonyloxy, alkyl- or aryl-sulfamoyl, alkyl- or aryl-sulfamoylamino, alkyl- or aryl-sulfonamido, alkyl- or aryl-ureido, alkyl- or aryl-oxycarbonyl, alkyl- or aryl-oxycarbonylamino and alkyl- or aryl-carbamoyl groups.

In particular each substituent may be an alkyl group such as methyl, t-butyl, heptyl, dodecyl, pentadecyl, octadecyl or 1,1,2,2-tetramethylpropyl; an alkoxy group such as methoxy, t-butoxy, octyloxy, dodecyloxy, tetradecyloxy, hexadecyloxy or octadecyloxy; an aryloxy group such as phenoxy, 4-t-butylphenoxy or 4-dodecyl-phenoxy; an alkyl- or arylacyloxy group such as acetoxy or dodecanoyloxy; an alkyl- or aryl-acylamino group such as acetamido, hexadecanamido or benzamido; an alkyl- or aryl-sulfonyloxy group such as methyl-sulfonyloxy, dodecylsulfonyloxy or 4-methylphenyl-sulfonyloxy; an alkyl- or aryl-sulfamoyl-group such as N-butylsulfamoyl or N-4-t-butylphenylsulfamoyl; an alkyl- or aryl-sulfamoylamino group such as N-butyl-sulfamoylamino or N-4-t-butylphenylsulfamoyl-amino; an alkyl- or aryl-sulfonamido group such as methane-sulfonamido, hexadecanesulfonamido or 4-chlorophenyl-sulfonamido; an alkyl- or aryl-ureido group such as methylureido or phenylureido; an alkoxy- or aryloxy-carbonyl such as methoxycarbonyl or phenoxycarbonyl; an alkoxy- or aryloxy-carbonylamino group such as methoxycarbonylamino or phenoxycarbonylamino; an alkyl- or aryl-carbamoyl group such as N-butylcarbamoyl or N-methyl-N-dodecylcarbamoyl; or a perfluoroalkyl group such as trifluoromethyl or heptafluoropropyl.

Suitably the above substituent groups have 1 to 30 carbon atoms, more preferably 8 to 20 aliphatic carbon atoms. A desirable substituent is an alkyl group of 12 to 18 aliphatic carbon atoms such as dodecyl, pentadecyl or octadecyl or an alkoxy group with 8 to 18 aliphatic carbon atoms such as dodecyloxy and hexadecyloxy or a halogen such as a meta or para chloro group, carboxy or sulfonamido. Any such groups may contain interrupting heteroatoms such as oxygen to form e.g. polyalkylene oxides.

In formula (I) or (IA) Z is a hydrogen atom or a group which can be split off by the reaction of the coupler with an oxidized color developing agent, known in the photographic art as a 'coupling-off group' and may preferably be hydrogen, chloro, fluoro, substituted aryloxy or mercaptotetrazole, more preferably hydrogen or chloro.

The presence or absence of such groups determines the chemical equivalency of the coupler, i.e., whether it is a 2-equivalent or 4-equivalent coupler, and its particular identity can modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction, and the like.

Representative classes of such coupling-off groups include, for example, halogen, alkoxy, aryloxy, heterocyclyloxy, sulfonyloxy, acyloxy, acyl, heterocyclylsulfonamido, heterocyclylthio, benzothiazolyl, phosophonyloxy, alkylthio, arylthio, and arylazo. These coupling-off groups are described in the art, for example, in U.S. Pat. Nos. 2,455,169; 3,227,551; 3,432,521; 3,467,563; 3,617,291; 3,880,661; 4,052,212; and 4,134,766; and in U.K. Patent Nos. and published applications 1,466,728; 1,531,927; 1,533,039; 2,066,755A, and 2,017,704A. Halogen, alkoxy, and aryloxy groups are most suitable.

Examples of specific coupling-off groups are —Cl, —F, —Br, —SCN, —OCH$_3$, —OC$_6$H$_5$, —OCH$_2$C(=O)NHCH$_2$CH$_2$OH, —OCH$_2$C(O)NHCH$_2$CH$_2$OCH$_3$, —OCH$_2$C(O)NHCH$_2$CH$_2$OC(=O)OCH$_3$, —P(=O)(OC$_2$H$_5$)$_2$, —SCH$_2$CH$_2$COOH,

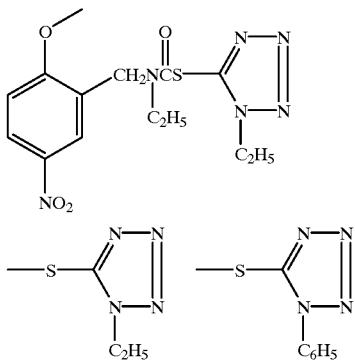

-continued

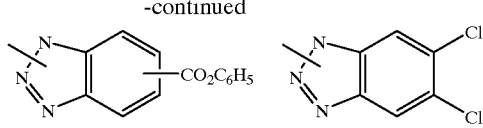

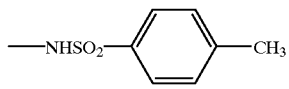

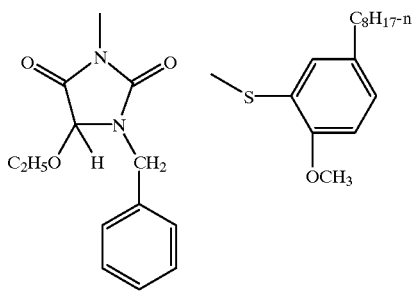

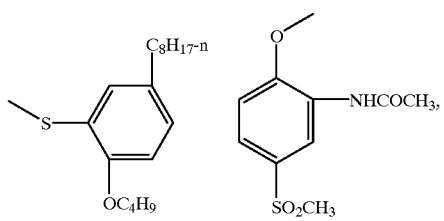

and

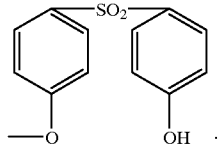

Typically, the coupling-off group is a chlorine atom, hydrogen atom or p-methoxyphenoxy group.

It is essential that the substituent groups be selected so as to adequately ballast the coupler and the resulting dye in the organic solvent in which the coupler is dispersed. The ballasting may be accomplished by providing hydrophobic substituent groups in one or more of the substituent groups. Generally a ballast group is an organic radical of such size and configuration as to confer on the coupler molecule sufficient bulk and aqueous insolubility as to render the coupler substantially nondiffusible from the layer in which it is coated in a photographic element. Thus the combination of substituent are suitably chosen to meet these criteria. To be effective, the ballast will usually contain at least 8 carbon atoms and typically contains 10 to 30 carbon atoms. Suitable ballasting may also be accomplished by providing a plurality of groups which in combination meet these criteria. In the preferred embodiments of the invention $R_1$ in formula (I) is a small alkyl group or hydrogen. Therefore, in these embodiments the ballast would be primarily located as part of the other groups. Furthermore, even if the coupling-off group Z contains a ballast it is often necessary to ballast the other substituents as well, since Z is eliminated from the molecule upon coupling; thus, the ballast is most advantageously provided as part of groups other than Z.

The following examples further illustrate preferred coupler of the invention. It is not to be construed that the present invention is limited to these examples.

IC-1

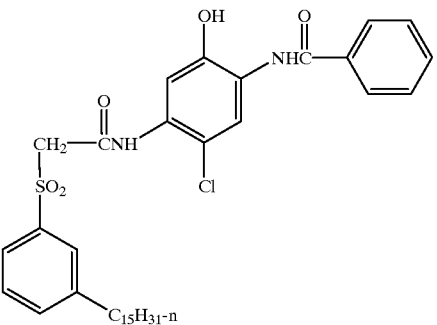

IC-2

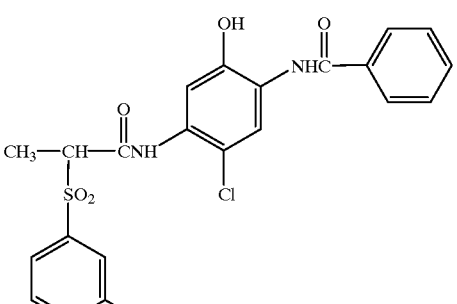

IC-3

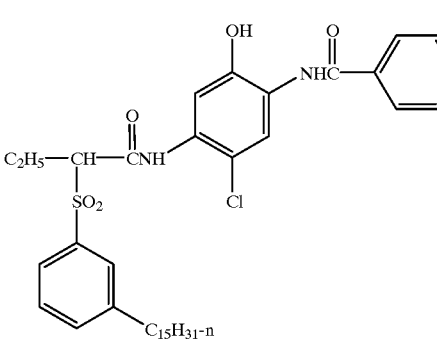

IC-4

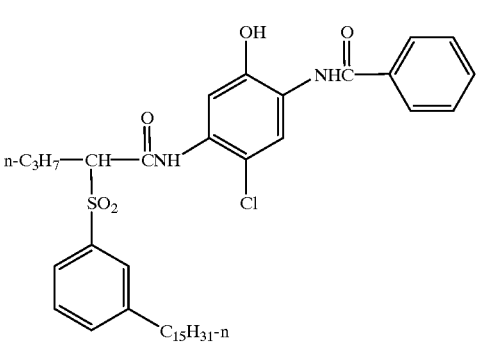

-continued
IC-5
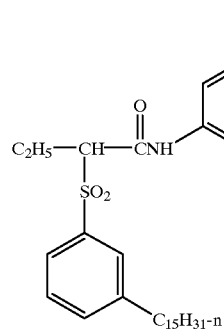
IC-9
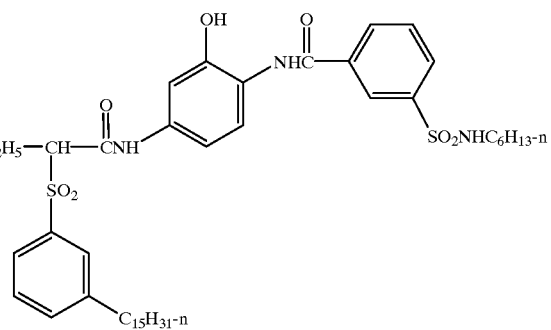
IC-6
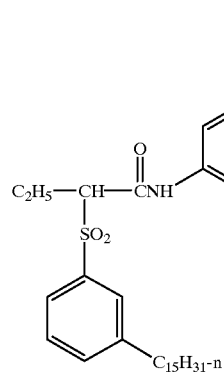
IC-10
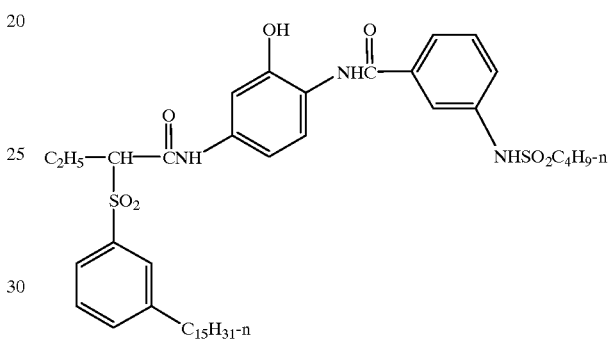
IC-7
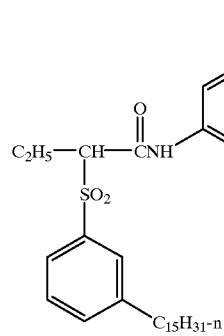
IC-11
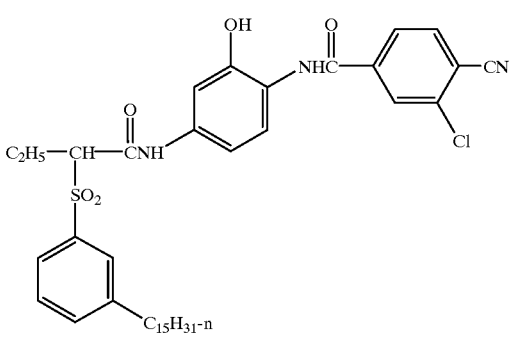
IC-8
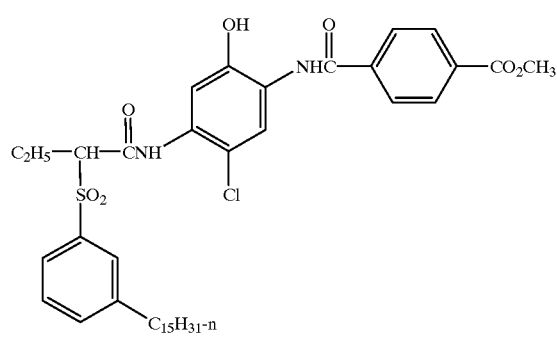
IC-12
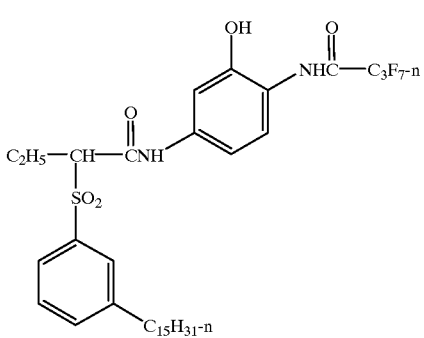

IC-13
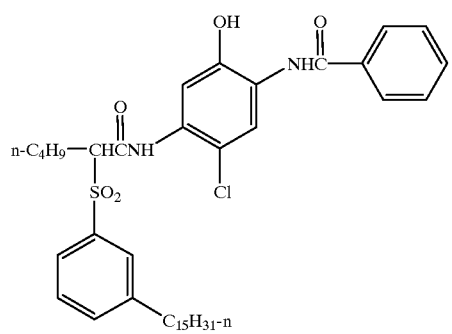
IC-17
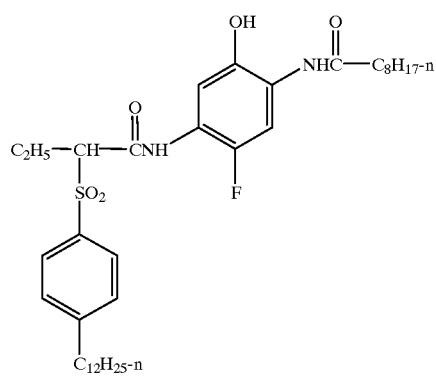
IC-14
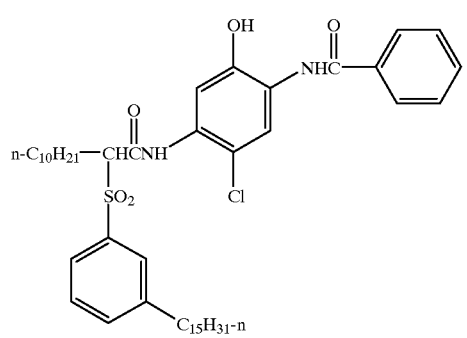
IC-18
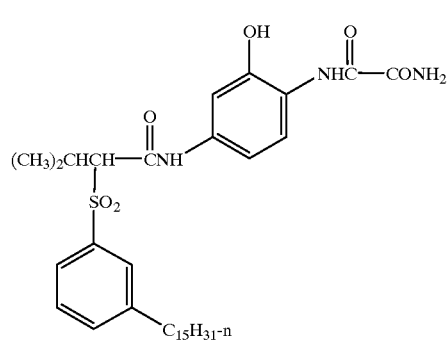
IC-15
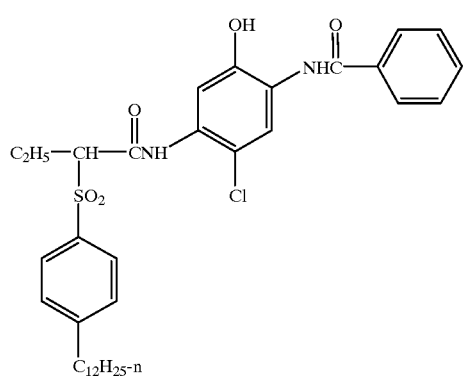
IC-19
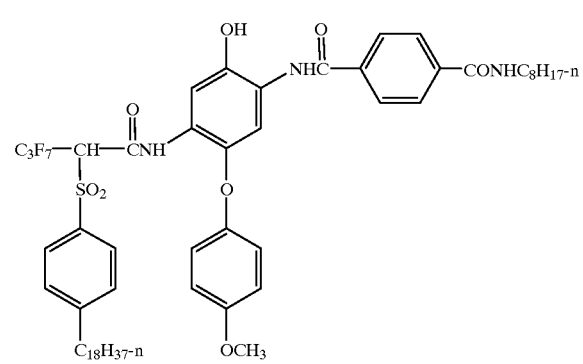
IC-16
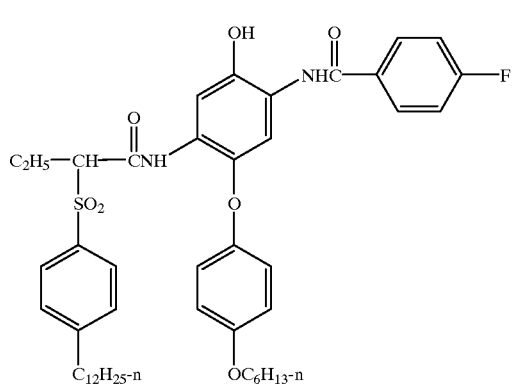
IC-20
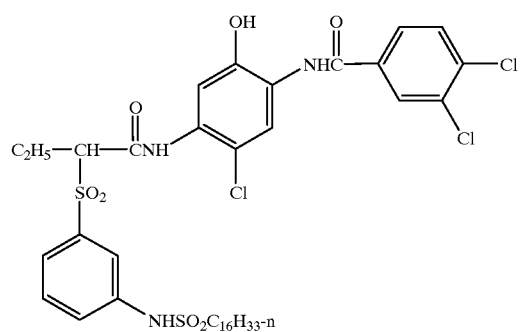

IC-21
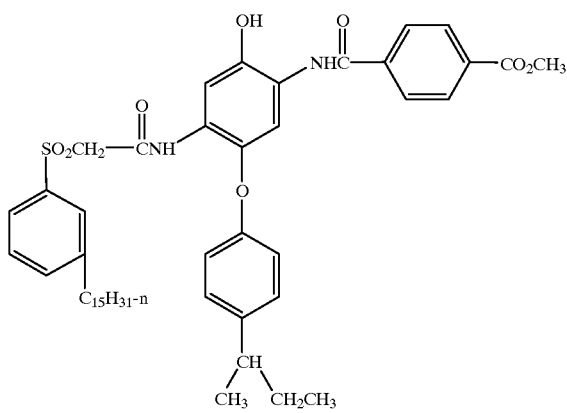
IC-25
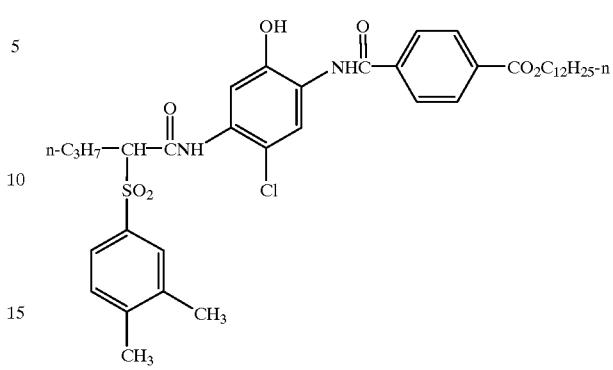
IC-22
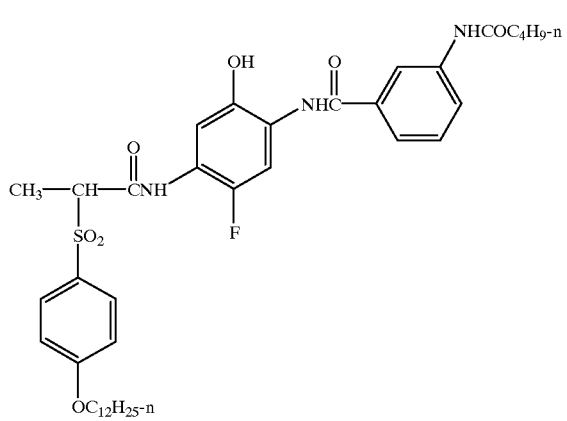
IC-26
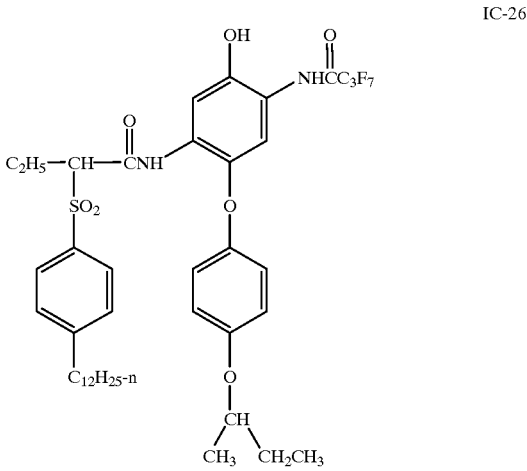
IC-23
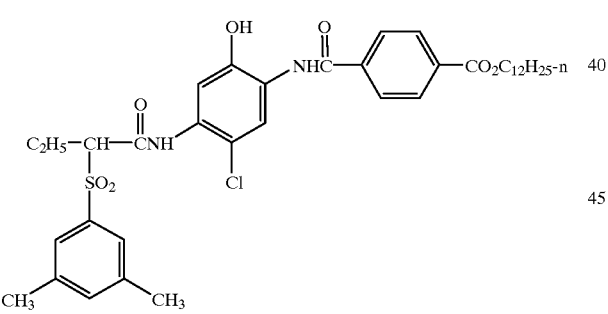
IC-27
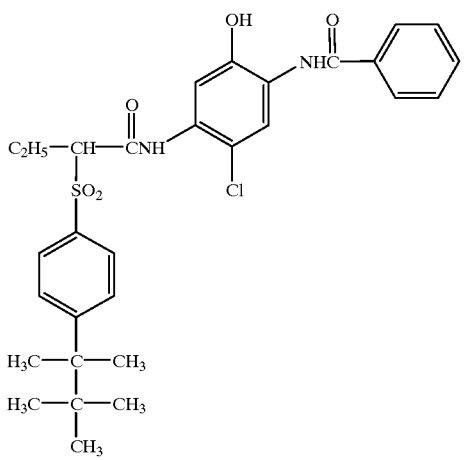
IC-24
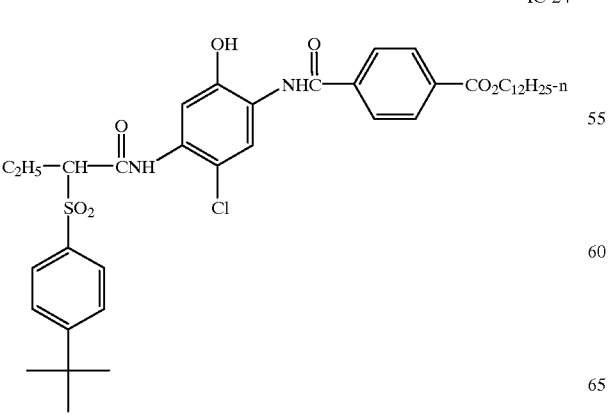

IC-28
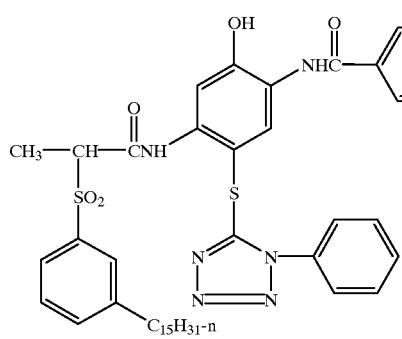
IC-29
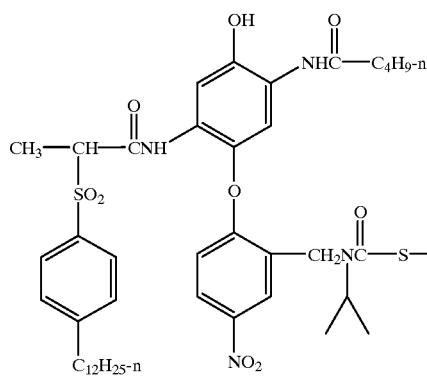
IC-30
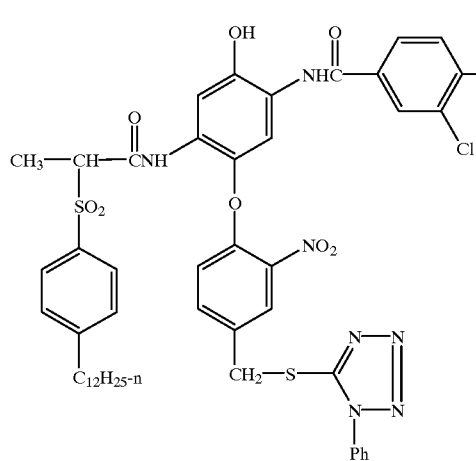
IC-31
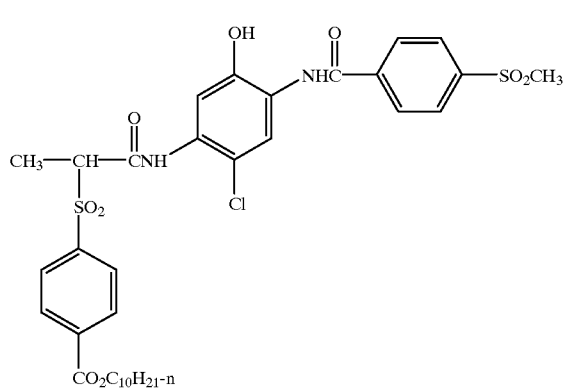
IC-32
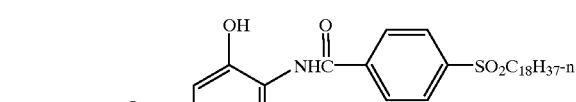
IC-33
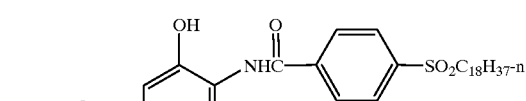
IC-34
IC-35

IC-36

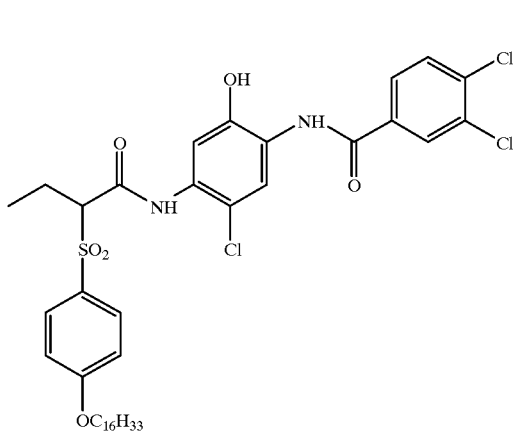

IC-40

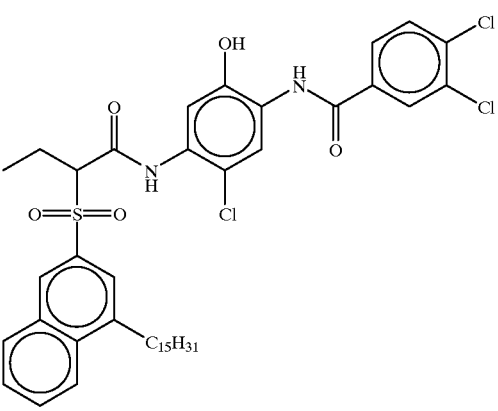

IC-37

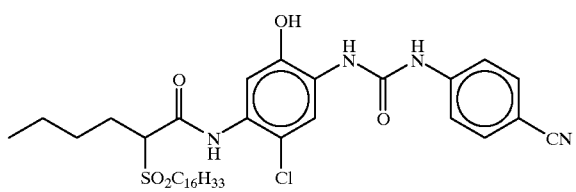

IC-38

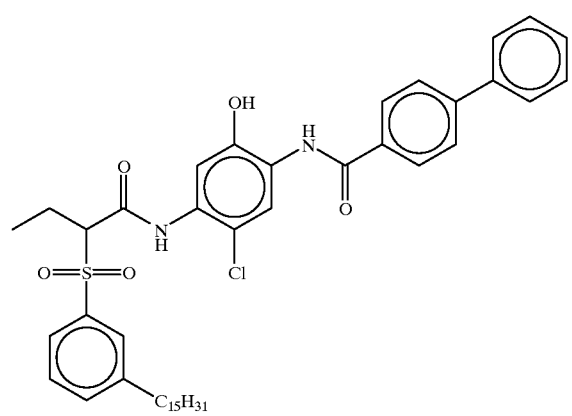

IC-39

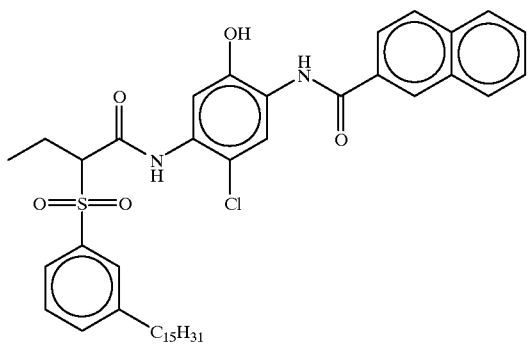

Preferred couplers are IC-3, IC-7, IC-35, and IC-36 because of their suitably narrow left bandwidths.

Couplers that form magenta dyes upon reaction with oxidized color developing agent are described in such representative patents and publications as: U.S. Pat. Nos. 2,311,082; 2,343,703; 2,369,489; 2,600,788; 2,908,573; 3,062,653; 3,152,896; 3,519,429; 3,758,309; and "Farbkuppler-eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents. Especially preferred couplers are 1H-pyrazolo [5,1-c]-1,2,4-triazole and 1H-pyrazolo [1,5-b]-1,2,4-triazole. Examples of 1H-pyrazolo [5,1-c]-1,2,4-triazole couplers are described in U.K. Patent Nos. 1,247,493; 1,252,418; 1,398,979; U.S. Pat. Nos. 4,443,536; 4,514,490; 4,540,654; 4,590,153; 4,665,015; 4,822,730; 4,945,034; 5,017,465; and 5,023,170. Examples of 1H-pyrazolo [1,5-b]-1,2,4-triazoles can be found in European Patent applications 176,804; 177,765; U.S. Pat. Nos. 4,659,652; 5,066,575; and 5,250,400.

Typical pyrazoloazole and pyrazolone couplers are represented by the following formulas:

MAGENTA-1

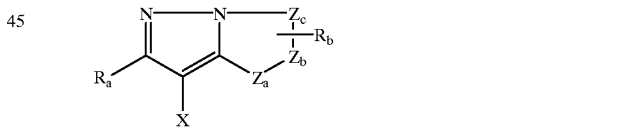

MAGENTA-2

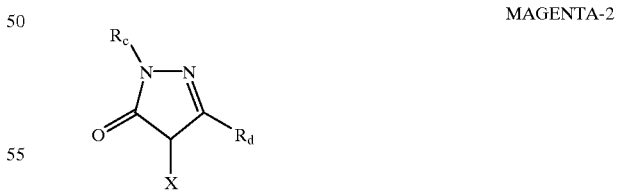

wherein $R_a$ and $R_b$ independently represent H or a substituent; $R_c$ is a substituent (preferably an aryl group); $R_d$ is a substituent (preferably an anilino, carbonamido, ureido, carbamoyl, alkoxy, aryloxycarbonyl, alkoxycarbonyl, or N-heterocyclic group); X is hydrogen or a coupling-off group; and $Z_a$, $Z_b$, and $Z_c$ are independently a substituted methine group, =N—, =C—, or —NH—, provided that one of either the $Z_a$—$Z_b$ bond or the $Z_b$—$Z_c$ bond is a double bond and the other is a single bond, and when the $Z_b$—$Z_c$ bond is a carbon-carbon double bond, it may form part of an aromatic ring, and at least one of $Z_a$, $Z_b$, and $Z_c$ represents a methine group connected to the group $R_b$.

Specific examples of such couplers are:

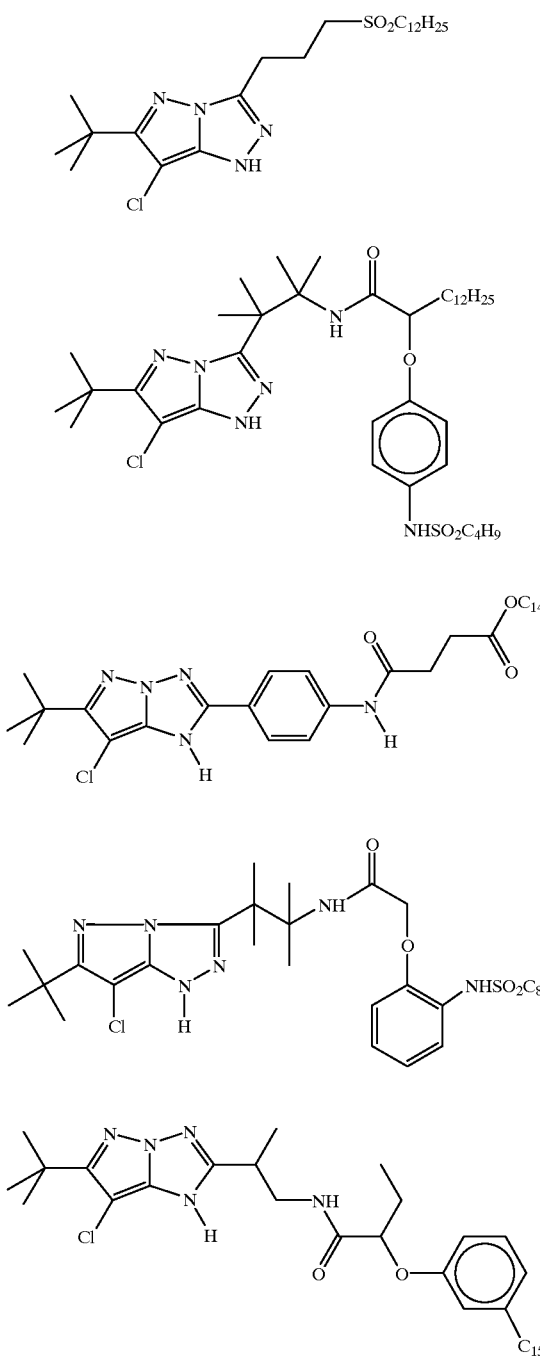

Couplers that form yellow dyes upon reaction with oxidized color developing agent are described in such representative patents and publications as: U.S. Pat. Nos. 2,298,443; 2,407,210; 2,875,057; 3,048,194; 3,265,506; 3,447,928; 3,960,570; 4,022,620; 4,443,536; 4,910,126; and 5,340,703 and "Farbkuppler-eine Literature Ubersicht," published in Agfa Mitteilungen, Band III, pp. 112–126 (1961). Such couplers are typically open chain ketomethylene compounds. Also preferred are yellow couplers such as described in, for example, European Patent Application Nos. 482,552; 510,535; 524,540; 543,367; and U.S. Pat. No. 5,238,803. For improved color reproduction, couplers which give yellow dyes that cut off sharply on the long wavelength side are particularly preferred (for example, see U.S. Pat. No. 5,360,713).

Typical preferred yellow couplers are represented by the following formulas:

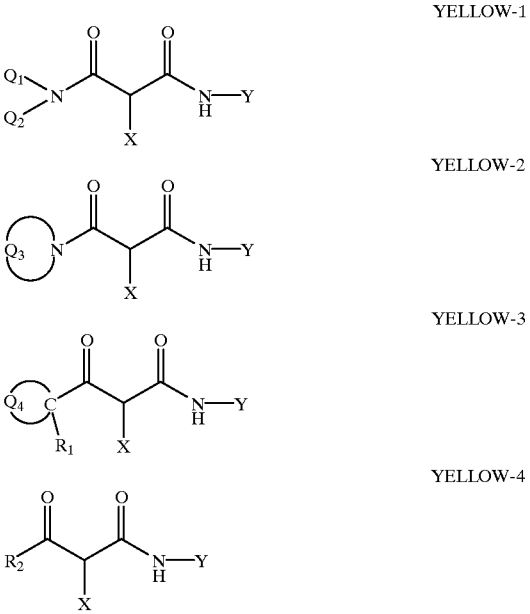

wherein $R_1$, $R_2$, $Q_1$ and $Q_2$ each represents a sub stituent; X is hydrogen or a coupling-off group; Y represents an aryl group or a heterocyclic group; $Q_3$ represents an organic residue required to form a nitrogen-containing heterocyclic group together with the >N—; and $Q_4$ represents nonmetallic atoms necessary to from a 3- to 5-membered hydrocarbon ring or a 3- to 5-membered heterocyclic ring which contains at least one hetero atom selected from N, O, S, and P in the ring. Particularly preferred is when $Q_1$ and $Q_2$ each represent an alkyl group, an aryl group, or a heterocyclic group, and $R_2$ represents an aryl or tertiary alkyl group.

Preferred yellow couplers can be of the following general structures:

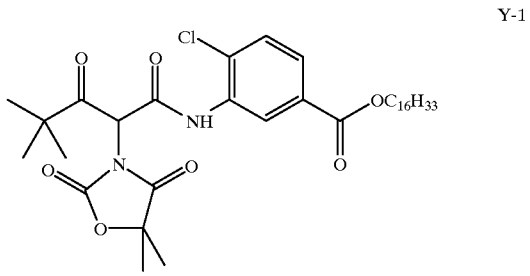

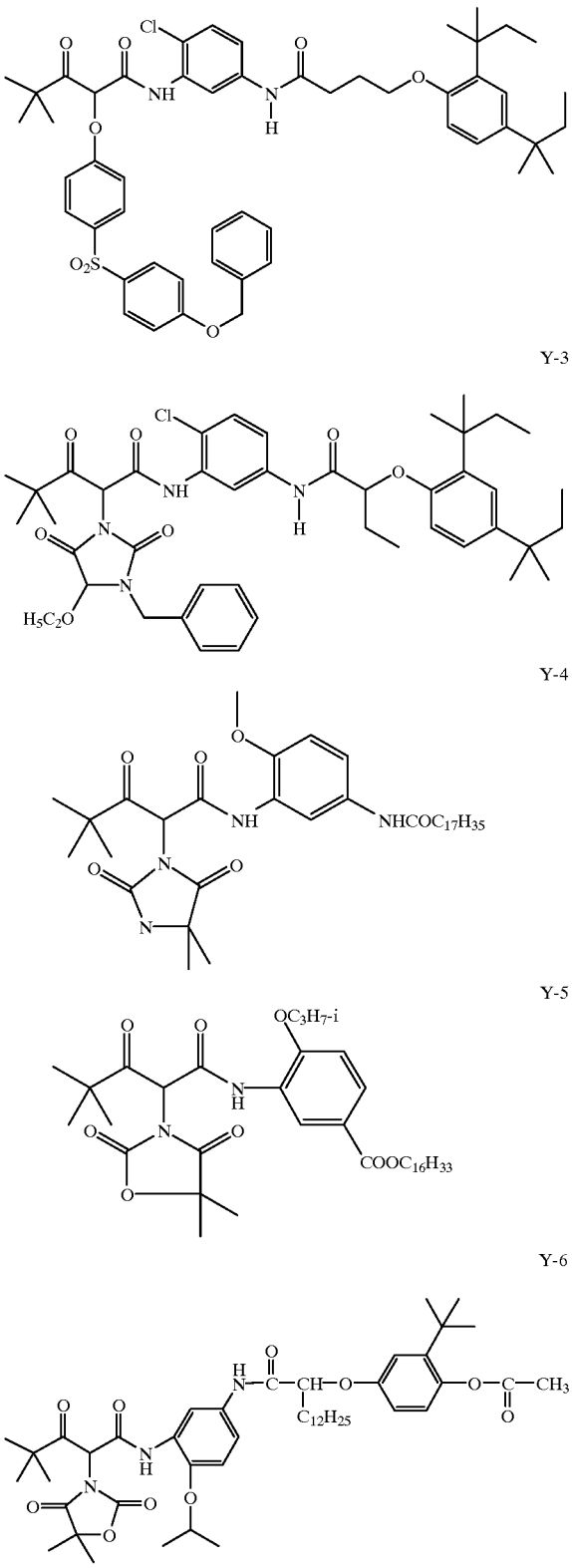

Unless otherwise specifically stated, substituent groups which may be substituted on molecules herein include any groups, whether substituted or unsubstituted, which do not destroy properties necessary for photographic utility. When the term "group" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-i-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amino, such as phenylanilino, 2-chloroanilino, diethylamino, dodecylamino; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing or releasable groups, etc. Generally, the above groups and substituents thereof may include those having up to 48 carbon atoms, typically 1 to 36 carbon atoms and usually less than 24 carbon atoms, but greater numbers are possible depending on the particular substituents selected.

Representative substituents on ballast groups include alkyl, aryl, alkoxy, aryloxy, alkylthio, hydroxy, halogen, alkoxycarbonyl, aryloxcarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents can also be further substituted.

Stabilizers and scavengers that can be used in these photographic elements, but are not limited to, the following.

ST-1

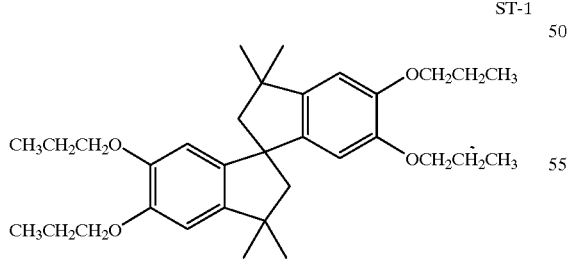

ST-2

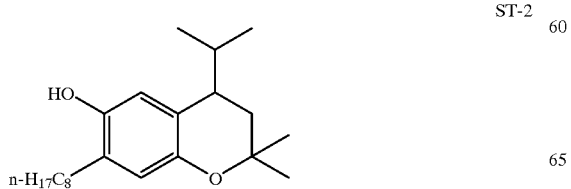

ST-3

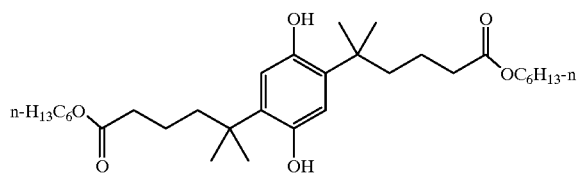

ST-4

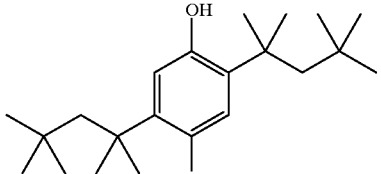

ST-5

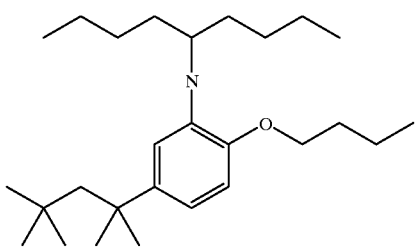

ST-6

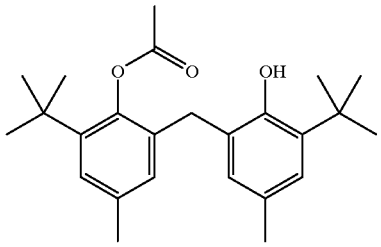

ST-7

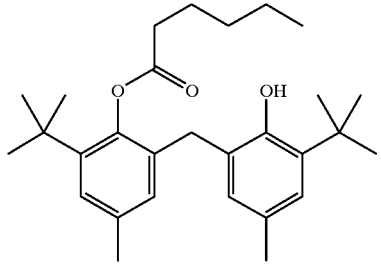

ST-8

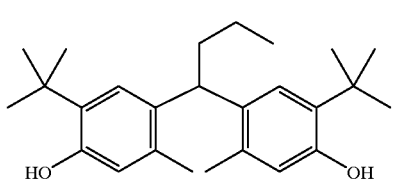

ST-9

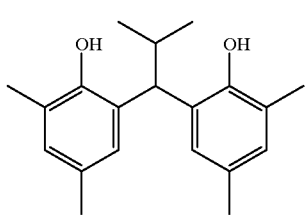

ST-10
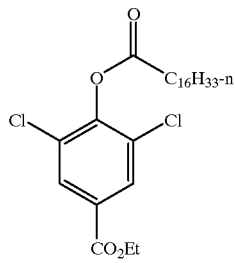
ST-11
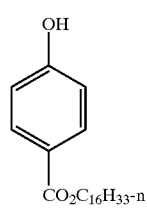
ST-12
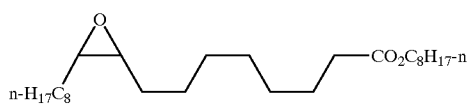
ST-13
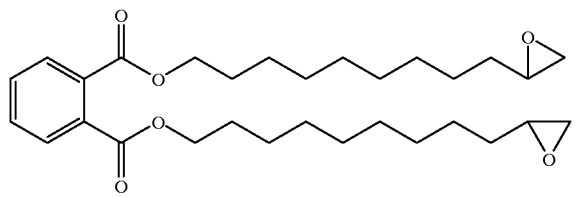
ST-14
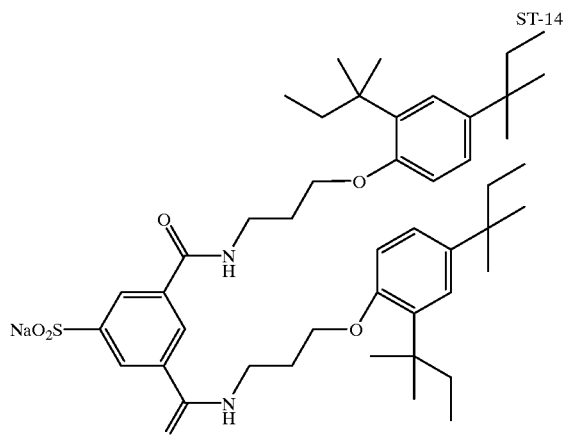
ST-15
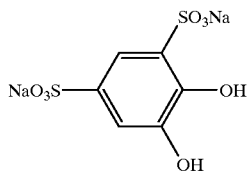
ST-16
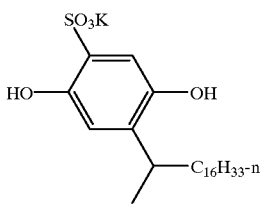
ST-17
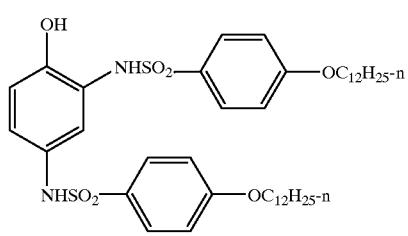
ST-18
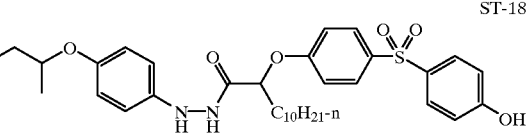
ST-19
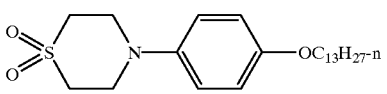
ST-20
n = 75–8,000
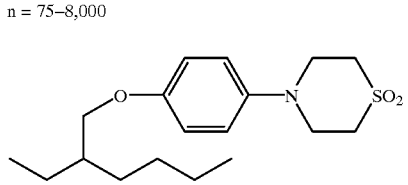
ST-22
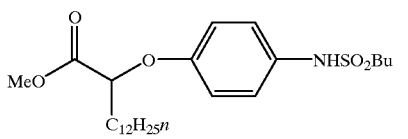
ST-23
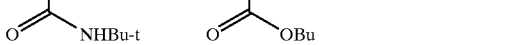
n:m 1:1 mw =75–100,000

ST-24

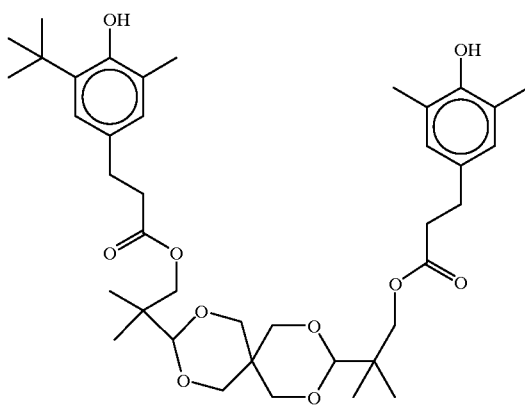

Examples of solvents which may be used in the invention include the following:

| | |
|---|---|
| Tritolyl phosphate | S-1 |
| Dibutyl phthalate | S-2 |
| Diundecyl phthalate | S-3 |
| N,N-Diethyldodecanamide | S-4 |
| N,N-Dibutyldodecanamide | S-5 |
| Tris(2-ethylhexyl)phosphate | S-6 |
| Acetyl tributyl citrate | S-7 |
| 2,4-Di-tert-pentylphenol | S-8 |
| 2-(2-Butoxyethoxy)ethyl acetate | S-9 |
| 1,4-Cyclohexyldimethylene bis(2-ethylhexanoate) | S-10 |

The dispersions used in photographic elements may also include ultraviolet (UV) stabilizers and so called liquid UV stabilizers such as described in U.S. Pat. Nos. 4,992,358; 4,975,360; and 4,587,346. Examples of UV stabilizers are shown below.

UV-1

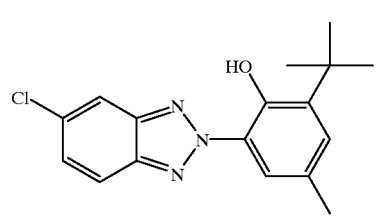

UV-2

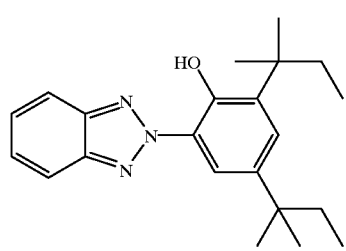

UV-3

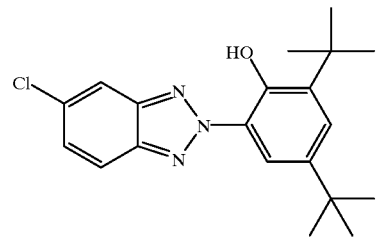

UV-4

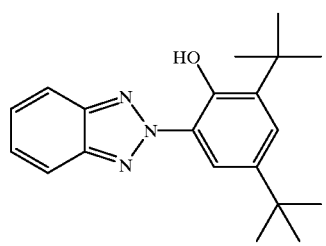

UV-5

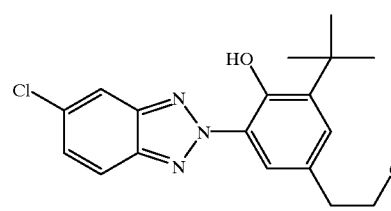

UV-6

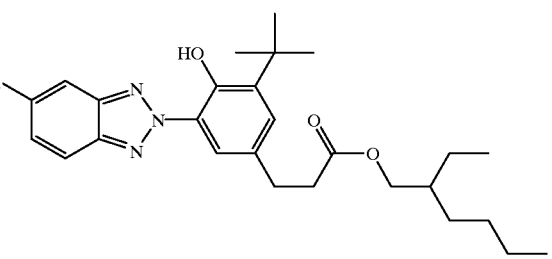

UV-7

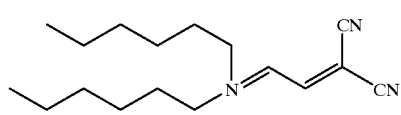

UV-8

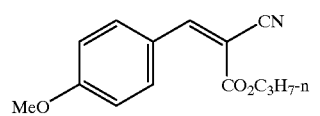

The aqueous phase may include surfactants. Surfactant may be cationic, anionic, zwitterionic or non-ionic. Useful surfactants include, but are not limited to, the following:

SF-1

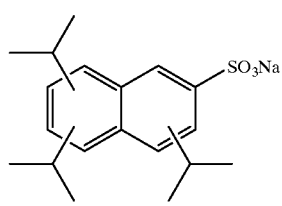

-continued

SF-2

CF$_3$•(CF$_2$)$_7$•SO$_3$Na

SF-3

CH$_3$•(CH$_2$)$_n$•SO$_3$Na,
n=12–14

SF-4

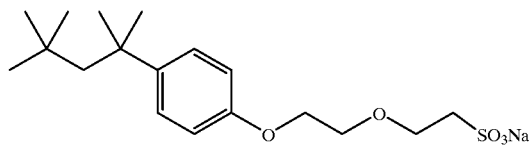

SF-5

CH$_3$•(CH$_2$)$_{11}$•OSO$_3$Na

SF-6

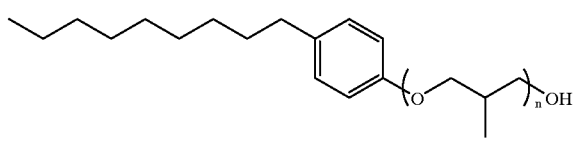

n = ca. 10

SF-7

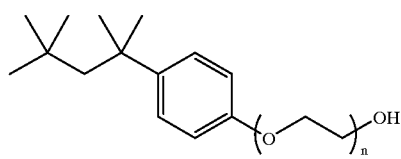

n = ca. 40

SF-8

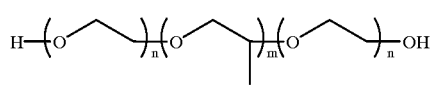

n = ca. 6, m = ca. 2

SF-9

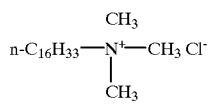

n-C$_{16}$H$_{33}$—N$^+$—CH$_3$ Cl$^-$
          |
          CH$_3$
(with CH$_3$ above)

SF-10

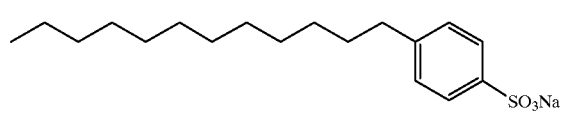

SF-11

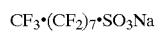
(n = ca. 10)

SF-12

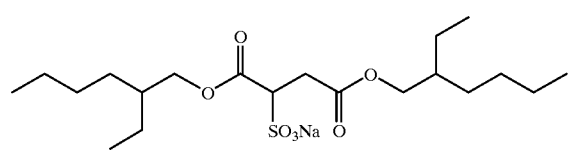

Further, it is contemplated to stabilize photographic dispersions prone to particle growth through the use of hydrophobic, photographically inert compounds such as disclosed by Zengerle et al in U.S. Pat. No. 5,468,604.

In a preferred embodiment the invention employs recording elements which are constructed to contain at least three silver halide emulsion layer units. A suitable full color, multilayer format for a recording element used in the invention is represented by Structure I.

STRUCTURE 1

Red-sensitized
  cyan dye image-forming silver halide emulsion unit
                          Interlayer
Green-sensitized
  magenta dye image-forming silver halide emulsion unit
                          Interlayer
Blue-sensitized
  yellow dye image-forming silver halide emulsion unit
                      ///// Support ///// wherein the red-sensitized, cyan dye image-forming silver halide emulsion unit is situated nearest the support; next in order is the green-sensitized, magenta dye image-forming unit, followed by the uppermost blue-sensitized, yellow dye image-forming unit. The image-forming units are separated from each other by hydrophilic colloid interlayers containing an oxidized developing agent scavenger to prevent color contamination. Silver halide emulsions satisfying the grain and gelatino-peptizer requirements described above can be present in any one or combination of the emulsion layer units. Additional useful multicolor, multilayer formats for an element of the invention include structures as described in U.S. Pat. No. 5,783,373. Each of such structures in accordance with the invention preferably would contain at least three silver halide emulsions comprised of high chloride grains having at least 50 percent of their surface area bounded by {100} crystal faces and containing dopants from classes (i) and (ii), as described above. Preferably each of the emulsion layer units contains emulsion satisfying these criteria.

Conventional features that can be incorporated into multilayer (and particularly multicolor) recording elements contemplated for use in the method of the invention are illustrated by *Research Disclosure*, Item 38957, cited above:
XI. Layers and layer arrangements
XII. Features applicable only to color negative
XIII. Features applicable only to color positive
  B. Color reversal
  C. Color positives derived from color negatives
XIV. Scan facilitating features.

The recording elements comprising the radiation sensitive high chloride emulsion layers according to this invention can be conventionally optically printed, or in accordance with a particular embodiment of the invention can be image-wise exposed in a pixel-by-pixel mode using suitable high energy radiation sources typically employed in electronic printing methods. Suitable actinic forms of energy encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic or panchromatic. For example, when the recording element is a multilayer multicolor element, exposure can be provided by laser or light emitting diode beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by T. H. James, *The Theory of the Photographic Process,* 4th Ed., Macmillan, 1977, Chapters 4, 6, 17, 18 and 23.

It has been observed that anionic $[MX_xY_yL_z]$ hexacoordination complexes, where M is a group 8 or 9 metal (preferably iron, ruthenium or iridium), X is halide or pseudohalide (preferably Cl, Br or CN) x is 3 to 5, Y is $H_2O$, y is 0 or 1, L is a C—C, H—C or C—N—H organic ligand, and Z is 1 or 2, are surprisingly effective in reducing high intensity reciprocity failure (HIRF), low intensity reciprocity failure (LIRF) and thermal sensitivity variance and in in improving latent image keeping (LIK). As herein employed HIRF is a measure of the variance of photographic properties for equal exposures, but with exposure times ranging from $10^{-1}$ to $10^{-6}$ second. LIRF is a measure of the varinance of photographic properties for equal exposures, but with exposure times ranging from $10^{-1}$ to 100 seconds. Although these advantages can be generally compatible with face centered cubic lattice grain structures, the most striking improvements have been observed in high (>50 mole %, preferably $\geq$90 mole %) chloride emulsions. Preferred C—C, H—C or C—N—H organic ligands are aromatic heterocycles of the type described in U.S. Pat. No. 5,462, 849. The most effective C—C, H—C or C—N—H organic ligands are azoles and azines, either unsustituted or containing alkyl, alkoxy or halide substituents, where the alkyl moieties contain from 1 to 8 carbon atoms. Particularly preferred azoles and azines include thiazoles, thiazolines and pyrazines.

The quantity or level of high energy actinic radiation provided to the recording medium by the exposure source is generally at least $10^{-4}$ ergs/cm², typically in the range of about $10^{-4}$ ergs/cm² to $10^{-3}$ ergs/cm² and often from $10^{-3}$ ergs/cm² to $10^2$ ergs/cm². Exposure of the recording element in a pixel-by-pixel mode as known in the prior art persists for only a very short duration or time. Typical maximum exposure times are up to $100\mu$ seconds, often up to $10\mu$ seconds, and frequently up to only $0.5\mu$ seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm² and are typically in the range of about $10^4$ to $10^6$ pixels/cm². An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988, which is hereby incorporated herein by reference. As previously indicated herein, a description of some of the details of conventional electronic printing methods comprising scanning a recording element with high energy beams such as light emitting diodes or laser beams, are set forth in Hioki U.S. Pat. No. 5,126,235, European Patent Applications 479 167 A1 and 502 508 A1.

Once imagewise exposed, the recording elements can be processed in any convenient conventional manner to obtain a viewable image. Such processing is illustrated by *Research Disclosure*, Item 38957, cited above:
XVIII. Chemical development systems
XIX. Development
XX. Desilvering, washing, rinsing and stabilizing In addition, a useful developer for the inventive material is a homogeneous, single part developing agent. The homogeneous, single-part color developing concentrate is prepared using a critical sequence of steps:

In the first step, an aqueous solution of a suitable color developing agent is prepared. This color developing agent is generally in the form of a sulfate salt. Other components of the solution can include an antioxidant for the color developing agent, a suitable number of alkali metal ions (in an at least stoichiometric proportion to the sulfate ions) provided by an alkali metal base, and a photographically inactive water-miscible or water-soluble hydroxy-containing organic solvent. This solvent is present in the final concentrate at a concentration such that the weight ratio of water to the organic solvent is from about 15:85 to about 50:50.

In this environment, especially at high alkalinity, alkali metal ions and sulfate ions form a sulfate salt that is precipitated in the presence of the hydroxy-containing organic solvent. The precipitated sulfate salt can then be readily removed using any suitable liquid/solid phase separation technique (including filtration, centrifugation or decantation). If the antioxidant is a liquid organic compound, two phases may be formed and the precipitate may be removed by discarding the aqueous phase.

The color developing concentrates of this invention include one or more color developing agents that are well known in the art that, in oxidized form, will react with dye forming color couplers in the processed materials. Such color developing agents include, but are not limited to, aminophenols, p-phenylenediamines (especially N,N-dialkyl-p-phenylenediamines) and others which are well known in the art, such as EP 0 434 097 A1 (published Jun. 26, 1991) and EP 0 530 921 A1 (published Mar. 10, 1993). It may be useful for the color developing agents to have one or more water-solubilizing groups as are known in the art. Further details of such materials are provided in *Research Disclosure*, publication 38957, pages 592–639 (September 1996). *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "*Research Disclosure*".

Preferred color developing agents include, but are not limited to, N,N-diethyl p-phenylenediamine sulfate (KODAK Color Developing Agent CD-2), 4-amino-3-methyl-N-(2-methane sulfonamidoethyl)aniline sulfate, 4-(N-ethyl-N-β-hydroxyethylamino)-2-methylaniline sulfate (KODAK Color Developing Agent CD-4), p-hydroxyethylethylaminoaniline sulfate, 4-(N-ethyl-N-2-methanesulfonylaminoethyl)-2-methylphenylenediamine sesquisulfate (KODAK Color Developing Agent CD-3), 4-(N-ethyl-N-2-methanesulfonylaminoethyl)-2-methylphenylenediamine sesquisulfate, and others readily apparent to one skilled in the art.

In order to protect the color developing agents from oxidation, one or more antioxidants are generally included in the color developing compositions. Either inorganic or organic antioxidants can be used. Many classes of useful antioxidants are known, including but not limited to, sulfites (such as sodium sulfite, potassium sulfite, sodium bisulfite and potassium metabisulfite), hydroxylamine (and derivatives thereof), hydrazines, hydrazides, amino acids, ascorbic acid (and derivatives thereof), hydroxamic acids, aminoketones, mono- and polysaccharides, mono- and polyamines, quaternary ammonium salts, nitroxy radicals, alcohols, and oximes. Also useful as antioxidants are 1,4-cyclohexadiones. Mixtures of compounds from the same or different classes of antioxidants can also be used if desired.

Especially useful antioxidants are hydroxylamine derivatives as described, for example, in U.S. Pat. Nos. 4,892,804; 4,876,174; 5,354,646; and 5,660,974, all noted above, and U.S. Pat. No. 5,646,327 (Bums et al). Many of these antioxidants are mono- and dialkylhydroxylamines having one or more substituents on one or both alkyl groups. Particularly useful alkyl substituents include sulfo, carboxy, amino, sulfonamido, carbonamido, hydroxy, and other solubilizing substituents.

More preferably, the noted hydroxylamine derivatives can be mono- or dialkylhydroxylamines having one or more hydroxy substituents on the one or more alkyl groups. Representative compounds of this type are described for example in U.S. Pat. No. 5,709,982 (Marrese et al), as having the structure I:

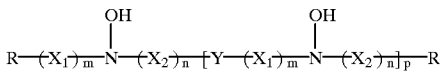

wherein R is hydrogen, a substituted or unsubstituted alkyl group of 1 to 10 carbon atoms, a substituted or unsubstituted hydroxyalkyl group of 1 to 10 carbon atoms, a substituted or unsubstituted cycloalkyl group of 5 to 10 carbon atoms, or a substituted or unsubstituted aryl group having 6 to 10 carbon atoms in the aromatic nucleus.

$X_1$ is —$CR_2(OH)CHR_1$- and $X_2$ is —$CHR_1CR_2(OH)$— wherein $R_1$ and $R_2$ are independently hydrogen, hydroxy, a substituted or unsubstituted alkyl group or 1 or 2 carbon atoms, a substituted or unsubstituted hydroxyalkyl group of 1 or 2 carbon atoms, or $R_1$ and $R_2$ together represent the carbon atoms necessary to complete a substituted or unsubstituted 5- to 8-membered saturated or unsaturated carbocyclic ring structure.

Y is a substituted or unsubstituted alkylene group having at least 4 carbon atoms, and has an even number of carbon atoms, or Y is a substituted or unsubstituted divalent aliphatic group having an even total number of carbon and oxygen atoms in the chain, provided that the aliphatic group has a least 4 atoms in the chain.

Also in Structure I, m, n and p are independently 0 or 1. Preferably, each of m and n is 1, and p is 0.

Specific di-substituted hydroxylamine antioxidants include, but are not limited to, N,N-bis(2,3-dihydroxypropyl)hydroxylamine, N,N-bis(2-methyl-2,3-dihydroxypropyl)hydroxylamine and N,N-bis(1-hydroxymethyl-2-hydroxy-3-phenylpropyl)hydroxylamine. The first compound is preferred.

The following examples illustrate the practice of this invention. They are not intended to be exhaustive of all possible variations of the invention. Parts and percentages are by weight unless otherwise indicated.

EXAMPLES

In this example, several variations of photographic nacreous images were made utilizing a voided polyolefin sheet. The nacreous images were differentiated by changing the amount of white pigment below the voided layer. Sample A represent prior art opalescence in that has no $TiO_2$ was either above or below the voided layer. Samples B, C, D and E contain varying amount of $TiO_2$ below the voided polymer layer. The nacreous images were compared to a typical light sensitive silver halide photographic paper that utilize non-voided cast coated polymer layers between the image layers and the base cellulose paper. This example will show that by utilizing a voided polymer layer below the imaging layers, the image has a nacreous appearance. Further, by adding white pigment below the voided layer, photographic whiteness, sharpness and printing speed are maintained compared to the typical photographic paper and were significantly improved over prior art opalescence images.

Cellulose Paper Base Utilized in the Example

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 2.0% $TiO_2$ on a dry weight basis. An about 110 g/m² bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

Typical Light Sensitive Photographic Paper Utilized in this Example (Control)

The control used in this invention was a conventionally resin coated photographic paper. The commercial grade paper as describe above was coated with 25.2 g/m² of a 4.5 melt index low density polyethylene containing 12.5% Kronos 1014 $TiO_2$ by weight of the layer. The resin was melt extruded onto the corona treated surface of the paper. The surface that was replicated was a conventional glossy surface. The corona treated backside of the paper was coated with a medium density clear polyethylene with a melt index 4.5. The resin was processed at 600° F. The clear backside resin was further corona treated and coated with an aqueous antistat containing an ionic salt with latex binder. The pigmented top side was coated with a typical 3 color coupler silver halide photosentive emulsion. Samples were then exposed and processed with RA-4 chemistry.

Example A

The following laminated photographic base was prepared by extrusion laminating the following sheets to both sides of a photographic grade cellulose paper support:

Top Voided Polymer Sheet

A composite 5 layer biaxially oriented polyolefin sheet (38 micrometers thick) (d=0.75 g/cc) consisting of a microvoided and oriented polypropylene core (approximately 73% of the total sheet thickness), with a titanium dioxide pigmented system (including required color adjustment) non-microvoided oriented polypropylene layer on the top side with blue colorant and optical brightener and a 1.2 micrometers layer of medium density polyethylene as the top most layer and a clear non-microvoided oriented polypropylene layer on the bottom side of the voided layer; the void initiating material is poly(butylene terephthalate).

Bottom Biaxially Oriented Polymer Sheet

A two-layer oriented polyester sheet consisting a core polyester layer and a skin layer of polyester that contains 5% by weight of a 5 micrometer silica addenda for photoprocessing conveyance. The two layer sheet was 25 micrometers thick (d=1.4 g/cc).

Both the above top and bottom sheets were extrusion laminated to a photographic grade cellulose paper of the example with a clear 13 melt index polyolefin (25 g/m$^2$). The structure of the nacreous support was as follows:

| | | |
|---|---|---|
| L1 | Silver Halide formed Image | |
| L2 | Medium Density Polyethylene + Blue tint | 0.8 Micrometers |
| L3 | Clear Polypropylene with Optical Brightener | 5.5 Micrometers |
| L4 | Void polypropylene with PBT | 16.5 Micrometers |
| L5 | Clear Polypropylene | 7 Micrometers |
| L6 | Clear polypropylene | 0.8 Micrometers |
| L7 | 13 MI Medium density clear polyethylene | 10 Micrometers |
| L8 | 110 g/m2 photo grade paper Cornea treated each side | 170 Micrometers |
| L9 | 13 MI Medium density clear polyethylene | 10 Micrometers |
| L10 | Biaxially oriented PET matte film (3 layers) Side next to L9 was reverse printed w Logo | 25 Micrometers |
| L11 | Conductive/Writable antistat | |

L1 is the image layer.
L2–L6 is an integral biaxially polymer sheet.
L7 is a tie layer to adhere the integral sheet and image to the base substrate.
L8 is the base substrate.
L9 is a tie layer to adhere the matte film to the back side of the substrate.
L10 is a writable/conductive layer and may further provide frictional properties.

Example B
(Feature)

This example was the same as above except L5 was 2% Kronos 1014 TiO$_2$ in polypropylene.

Example C
(Feature)

This example was the same as example A except L5 was 4% Kronos 1014 TiO$_2$ in polypropylene.

Example D
(Feature)

This example was the same as example A except L5 was 9% Kronos 1014 TiO$_2$ in polypropylene.

Example E
(Feature)

This example is the same as example A except L5 was 9% Kronos 1014 TiO$_2$ in polypropylene and L7 is a blend of 80% 4.5 MI pigmented low density polyethylene with 12.5% Kronos 1014 TiO$_2$ and 20% Exxon Exact 30 metallocene elastomer coated at 12g/m$^2$.

Sharpness, or the ability to replicate fine details of the image, was measured by mathematical calculations utilizing a method is called the MTF or Modulation Transfer Function. In this test, a fine repeating sinusoidal pattern of photographic density variation near the resolution of the human eye was exposed on a photographic print. When the image was developed, the resulting density variation was compared to the expected density, and a ratio was obtained to determine the magnitude of the transfer coefficient at that frequency. A number of 100 denotes perfect replication, and this number was relatively easy to obtain at spatial frequencies of 0.2 cycle/mm. At a finer spacing of 2.0 cycles/mm, typical color photographic prints have a 70 rating or 70% replication.

TABLE 1

| Example | Speed* Delta Log H from control | D-Min.+ | Nacreous Appearance | Sharpness (MTF) |
|---|---|---|---|---|
| Control | 0 | 0.10 | No | 71 |
| A | −0.12 | 0.35 | Yes | 52 |
| B | −0.059 | 0.212 | Yes | 58 |
| C | −0.057 | 0.210 | Yes | 60 |
| D | −0.059 | 0.209 | Yes | 62 |
| E | −0.062 | 0.188 | Yes | 68 |

*the average of the red layer, green layer and blue layer speed response
+average red layer, green layer, and blue layer minimum density response (D-min)

As can be seen from Table 1, the control which is standard resin coated paper which has TiO$_2$ immediately adjacent to the photographic emulsion is used as the baseline line measurement for photographic speed. When Sample A that has no TiO$_2$ is compared to the control, there is a decrease in the printing speed. Samples B–E that have TiO$_2$ below the voided layer regains a significant portion of the speed loss which clearly demonstrates the utility of this invention. The next column which is a measure of D-min or density of a processed clear emulsion (measure of the base with processed clear emulsion ). When Sample A that has voids and no TiO$_2$ is compared to the control, it is noted that the D-min is increased which shows higher background density when TiO$_2$ is removed from the imaging element. Samples B, C, and D respectively add 2,4 and 9% TiO$_2$ to the layer below the voids, and Sample E adds 9% TiO$_2$ as well as a layer with 12% TiO$_2$ below the voided layer. The number clearly shows that as the TiO$_2$ level is increased, the D-min is reduced. Sample A that has voids but no TiO$_2$ has a D-Min of 0.350 vs. Sample E that has a D-Min of 0.188. This is a significant improvement of over 46%. This clearly demonstrates the impact of this invention. Table 1 also shows that has the TiO$_2$ is removed (Sample A vs. Samples B–E) from its adjacent position from under the emulsion the nacreous appearance is achieved. The nacreous appearance is a qualitative assessment of a pearl or metallic-like appearance that is present in the print. The last column in Table 1 is a measure of sharpness. The control when compared to the prior art opalescence (Control vs. Sample A) has a major loss in sharpness when there is no TiO$_2$. As TiO$_2$ is added below the voided layer (Samples B–D), there is a trend of improved sharpness when compared to prior art Sample A. While this is important, the major improvement in sharpness is noted in Sample E which not only has TiO$_2$ below the voids, but also in the layer used to adhere the biaxially oriented sheet to the base. Sample E that has a sharpness of 68 is only slightly less sharp than the control. In the MTF measurement this is not considered a noticeable change.

TABLE 2

Dye Reflection Purity

| Color | Cyan Density | | | Yellow Density | | | Magenta | | |
| --- | --- | --- | --- | --- | --- | --- | --- | --- | --- |
| Major/ Unwanted Color | Major Density Red | Red | Blue | Major Density Blue | Red | Green | Major Density Green | Red | Blue |
| Control | 2.65 | 0.80 | 0.546 | 2.2 | 0.157 | 0.437 | 2.4 | 0.399 | 0.498 |
| A | 2.63 | 0.730 | 0.497 | 2.2 | 0.231 | 0.407 | 2.4 | 0.389 | 0.452 |
| B | 2.62 | 0.729 | 0.495 | 2.2 | 0.231 | 0.408 | 2.4 | 0.389 | 0.452 |
| C | 2.61 | 0.730 | 0.496 | 2.2 | 0.232 | 0.408 | 2.4 | 0.387 | 0.451 |
| D | 2.62 | 0.730 | 0.493 | 2.3 | 0.229 | 0.405 | 2.4 | 0.386 | 0.449 |
| E | 2.65 | 0.728 | 0.484 | 2.2 | 0.217 | 0.370 | 2.4 | 0.380 | 0.440 |

Below is the test method to determine the dye purity or unwanted absorption effects used in Table 2:

A quantitative method to describe the appearance of "brighter" or "cleaner" colors provided by the invention needed to be developed. As a means to provide this metric, the following test was developed:

Separation exposures were made utilizing a cast carbon step tablet (0 to 3 logH, 0.15 increments) and conventional separation red, green, blue separation filtration.

The samples were processed in conventional RA-4 chemistry at the recommended 45 second development times. The samples were then densitometered using a 0/45 reflection densitometer containing STATUS A red, green, and blue filters. Each processed separation exposure was densitometered using the RGB filtration as a means of determining the major dye densities, as well as any unwanted dyes (minors) densities.

These data were identified as follows:
For the RED separation exposure:
 RED=MAJOR
 CYAN green=MINOR (or unwanted absorption of the RED)
 CYAN blue=MINOR (or unwanted absorption of the RED)
For the GREEN separation exposure:
 GREEN=MAJOR
 MAGENTA red=MINOR (or unwanted absorption of the GREEN)
 MAGENTA blue=MINOR (or unwanted absorption of the GREEN)
For the BLUE separation exposure:
 BLUE=MAJOR
 YELLOW red=MINOR (or unwanted absorption of the BLUE)
 YELLOW green=MINOR (or unwanted absorption of the BLUE)

Lower unwanted absorptions will result in "cleaner" appearing dye densities. When comparing the dye purity data from Table 1, the resin coated control example has more unwanted absorbences than examples A–E. The major cyan, yellow, and magenta densities for all samples are approximately equal with testing error. In all cases the unwanted absorbences are less when there is no $TiO_2$ between the voided layer and the photographic layer. For example, the resin coated control which has $TiO_2$ adjacent to the photographic layer has a green component for the cyan dye of 0.801, and Example E has a green component for the cyan of 0.728. This represents a 9.1% improvement in dye purity. When comparing the blue component of cyan, the control has a density of 0.546, and the invention example E has a blue density of 0.484 or an 11% improvement.

In summary, by utilizing a voided polymer layer below the imaging layers, the photographic image has a desirable nacreous appearance compared to the control photographic paper. Further, by adding white pigment below the voided layer, photographic whiteness, sharpness, and printing speed are maintained compared to the typical photographic paper and were significantly improved over prior art opalescent images. The addition of white pigment below the voided layer solves many of the problems with prior art opalescent images. The invention is an imaging member comprising an image layer, a voided layer below the image layer, and below the voided layer a layer comprising white pigment wherein said imaging member is substantially free of white pigment above the voided layer, and the voided layer comprises a polymer matrix and voids containing gas.

The invention has been described in detail with particular reference to certain preferred embodiments thereof, but it will be understood that variations and modifications can be effected within the spirit and scope of the invention.

What is claimed is:

1. An imaging member comprising an image layer and an oriented polymer sheet below said image layer, said polymer sheet comprising a voided layer and below and adjacent said voided layer a layer comprising white pigment, wherein said imaging member is substantially free of white pigment above said voided layer, said voided layer comprises a polymer matrix and voids containing gas and said white pigment containing layer has at least 0.1 grams per cc of titanium dioxide.

2. The imaging member of claim 1 wherein said voided layer has voids which at any point in the member comprise at least six voids in the vertical direction.

3. The imaging member of claim 1 wherein said voided layer has voids which have a maximum length to maximum height ratio of greater than 4.0:1.

4. The imaging member of claim 1 wherein said voided layer has voids which have a maximum length to maximum width ratio of greater than 1:1.

5. The imaging member of claim 1 wherein said polymer matrix and the gas in the voids have a difference of refractive index of greater than 0.3.

6. The imaging member of claim 1 wherein said voids and said white pigment are both in a biaxially oriented polyolefin sheet.

7. The imaging member of claim 1 wherein said white pigment containing layer has a spectral transmission less than 22%.

8. The imaging member of claim 7 wherein said voided layer has a thickness of between 8 and 50 $\mu$m.

9. The imaging of claim 8 wherein a layer between said voided layer and said image layer comprises optical brightener.

10. The imaging member of claim 4 wherein said voids and said white pigment are both in a biaxially oriented polyester sheet.

11. The imaging member of claim 1 wherein said white pigment comprises titanium dioxide.

12. The imaging member of claim 1 wherein said voids have a thickness in the vertical direction of between 0.5 and 4 μm.

13. The imaging member of claim 1 wherein said imaging member is provided with a substrate comprising cellulose paper.

14. The imaging member of claim 1 wherein said imaging member is provided with a substrate comprising polyester.

15. The imaging member of claim 1 wherein said image layer comprises at least one layer comprising electrophotographic image receiving material.

16. The imaging member of claim 1 comprising a formed image in said image layer and a protective polymer layer overlaying said formed image.

17. The imaging member of claim 1 wherein said image layer comprises at least one layer containing photosensitive silver halide.

18. The imaging member of claim 1 wherein said image layer comprises at least one layer comprising ink jet receiving material.

19. The imaging member of claim 1 wherein said image layer comprises at least one layer comprising thermal dye receiving material.

20. The imaging member of claim 17 further comprising matte beads in an upper gelatin protective layer.

21. The imaging member of claim 16 wherein said imaging member is provided with a substrate comprising a bottom outward facing pressure sensitive adhesive layer.

* * * * *